(12) United States Patent
Kageyama et al.

(10) Patent No.: US 11,949,952 B2
(45) Date of Patent: Apr. 2, 2024

(54) DISPLAY APPARATUS, INFORMATION TERMINAL AND INFORMATION PROCESSING METHOD

(71) Applicant: MAXELL, LTD., Kyoto (JP)

(72) Inventors: Masahiro Kageyama, Tokyo (JP); Takashi Matsubara, Tokyo (JP); Koichi Hamada, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/704,225

(22) Filed: Mar. 25, 2022

(65) Prior Publication Data
US 2022/0232284 A1 Jul. 21, 2022

Related U.S. Application Data

(63) Continuation of application No. 16/877,533, filed on May 19, 2020, now abandoned, which is a
(Continued)

(51) Int. Cl.
*H04N 21/45* (2011.01)
*G06Q 20/12* (2012.01)
(Continued)

(52) U.S. Cl.
CPC ....... *H04N 21/4532* (2013.01); *G06Q 20/123* (2013.01); *G06Q 20/405* (2013.01);
(Continued)

(58) Field of Classification Search
CPC .. H04N 21/4532; H04N 21/278; H04N 21/41; H04N 21/41265; H04N 21/4222;
(Continued)

(56) References Cited

U.S. PATENT DOCUMENTS

2009/0138805 A1 5/2009 Hildreth
2011/0113441 A1* 5/2011 Jeong ................. H04N 21/2668
725/25
(Continued)

FOREIGN PATENT DOCUMENTS

JP 2003-069912 A 3/2003
JP 2003-150866 5/2003
(Continued)

OTHER PUBLICATIONS

International Search Report of PCT/JP2015/085100 dated Mar. 15, 2016.
(Continued)

*Primary Examiner* — Kunal Langhnoja
(74) *Attorney, Agent, or Firm* — Mattingly & Malur, PC

(57) ABSTRACT

A television receiver 101 is connected to two or more wireless terminals via a communication line. A controller 214 and a network I/F 212 in the television receiver 101 send pieces of login information entered from the two or more wireless terminals to the content distribution server and obtain pieces of content list information each generated by the content distribution server based on the pieces of login information. An aggregated content list in which the obtained pieces of content list information are aggregated is generated. The display 210 displays the aggregated content list. The content list information includes content available for viewing on the information terminal connected to the communication line. The aggregated content list includes content available for viewing on the two or more information terminals in which the pieces of content list information are aggregated.

4 Claims, 27 Drawing Sheets

Related U.S. Application Data continuation of application No. 16/061,873, filed as application No. PCT/JP2015/085100 on Dec. 15, 2015, now abandoned.

(51) Int. Cl.
| | |
|---|---|
| *G06Q 20/40* | (2012.01) |
| *G06Q 30/06* | (2023.01) |
| *H04N 21/278* | (2011.01) |
| *H04N 21/41* | (2011.01) |
| *H04N 21/422* | (2011.01) |
| *H04N 21/462* | (2011.01) |
| *H04N 21/475* | (2011.01) |
| *H04N 21/482* | (2011.01) |

(52) U.S. Cl.
CPC .......... *G06Q 30/06* (2013.01); *H04N 21/278* (2013.01); *H04N 21/41* (2013.01); *H04N 21/41265* (2020.08); *H04N 21/4222* (2013.01); *H04N 21/462* (2013.01); *H04N 21/4622* (2013.01); *H04N 21/475* (2013.01); *H04N 21/4753* (2013.01); *H04N 21/482* (2013.01)

(58) Field of Classification Search
CPC ............. H04N 21/462; H04N 21/4622; H04N 21/475; H04N 21/4753; H04N 21/482; G06Q 20/123; G06Q 20/405; G06Q 30/06

See application file for complete search history.

(56) References Cited

U.S. PATENT DOCUMENTS

| | | | |
|---|---|---|---|
| 2013/0091214 A1 | 4/2013 | Kelleman | |
| 2013/0160041 A1 | 6/2013 | Yoshizawa et al. | |
| 2014/0147020 A1* | 5/2014 | Baldwin | G06Q 20/40145 |
| | | | 382/118 |
| 2015/0134724 A1 | 5/2015 | Hao et al. | |
| 2015/0350274 A1* | 12/2015 | Chan | H04L 65/612 |
| | | | 705/12 |

FOREIGN PATENT DOCUMENTS

| | | |
|---|---|---|
| JP | 2003-208375 | 7/2003 |
| JP | 2005-020220 | 1/2005 |
| JP | 2005-157894 A | 6/2005 |
| JP | 2005-277550 A | 10/2005 |
| JP | 2006-295389 A | 10/2006 |
| JP | 2011-504710 A | 2/2011 |
| JP | 2011-259384 A | 12/2011 |
| JP | 2013126054 A | 6/2013 |
| JP | 2014-080508 A | 5/2014 |
| WO | 2014/080508 A1 | 5/2014 |
| WO | 2014/083669 A1 | 6/2014 |
| WO | 2015/063872 A1 | 5/2015 |

OTHER PUBLICATIONS

Japanese Office Action received in corresponding Japanese Application No. 2022-151751 dated Sep. 5, 2023.

* cited by examiner

FIG. 8(a)

| USER ID / 801 | PASSWORD / 802 | USERNAME / 803 | SETTING PARAMETER / 804 | APPLICATION / 805 | DOWNLOADED CONTENT / 806 | DEVICE TYPE INFORMATION / 807 |
|---|---|---|---|---|---|---|
| 00000101 | a8DF12rw | T.Matsu | AAA<br>BBB<br>CCC | AA<br>BB<br>CC | TITLE 1<br>TITLE 2 | WIRELESS TERMINAL A |

FIG. 8(b)

| USER ID | PASSWORD | USERNAME | SETTING PARAMETER | APPLICATION | DOWNLOADED CONTENT | DEVICE TYPE INFORMATION |
|---|---|---|---|---|---|---|
| 00000102 | Lr28I9Os | M.Kage | GGG<br>HHH<br>JJJ | AA<br>DD<br>EE | TITLE 3<br>TITLE 4 | WIRELESS TERMINAL B |

FIG. 9 (a)

| USER ID /801 | PASSWORD /802 | USERNAME /803 | NAME | STREET ADDRESS | CONTACT |
|---|---|---|---|---|---|
| 00000101 | a8DF12rw | T.Matsu | XX MATSU | KANAGAWA-KEN ... | abc@def.ne.jp |
| 00000102 | Lr28l90s | M.Kage | XX KAGE | TOKYO ... | ghi@jkl.ne.jp |
| ... | ... | ... | ... | ... | ... |

FIG. 9 (b)

| USER ID /801 | PASSWORD /802 | DEVICE ID /901 | MODEL NAME |
|---|---|---|---|
| 00000101 | a8DF12rw | 3D:4F:1E:00:xx:xx | AB-C1000 (TELEVISION RECEIVER) |
| 00000101 | a8DF12rw | 1F:11:0E:3E:yy:yy | DF-2000F (WIRELESS TERMINAL A) |
| 00000102 | Lr28l90s | 9F:8E:7D:6C:zz:zz | GH-10000 (WIRELESS TERMINAL B) |
| ... | ... | ... | ... |

FIG. 29 (a)

| SERVICE DIVISION (2901) | VIEWING SHAREABILITY (2902) |
|---|---|
| COMMON MOVIES | YES |
| R18 RATED MOVIES | NO |
| GAMES | YES |

FIG. 29 (b)

| CONTENT/APPLICATION DIVISION (2903) | VIEWING SHAREABILITY (2904) |
|---|---|
| TITLE A | YES |
| TITLE B | NO |
| TITLE C | YES |

FIG. 29 (c)

| PROVIDER DIVISION (2905) | VIEWING SHAREABILITY (2906) |
|---|---|
| PROVIDER A | YES |
| PROVIDER B | NO |
| PROVIDER C | YES |

FIG. 29 (d)

| BILLING DESTINATION DIVISION (2907) | VIEWING SHAREABILITY (2908) |
|---|---|
| COMPANY A | YES |
| COMPANY B | NO |
| COMPANY C | YES |

DISPLAY APPARATUS, INFORMATION TERMINAL AND INFORMATION PROCESSING METHOD

TECHNICAL FIELD

The present invention relates to a display apparatus, an information terminal and an information processing method, and particularly relates to a technique effective for viewing content with using a plurality of terminal apparatuses.

BACKGROUND ART

In recent years, distribution services that distribute content such as movies and music via the internet have been widely used. For example, Patent Document 1 is known as such a distribution service. Patent Document 1 describes that "there is provided a network terminal system that allows a display apparatus to be shared between a plurality of users while protecting privacy of each user", and describes a technique that allows the television receiver to be shared between a plurality of users and to be selectively used while protecting the privacy of each user by using a wireless terminal to operate a television receiver.

RELATED ART DOCUMENTS

Patent Documents

Patent Document 1: Japanese Unexamined Patent Application Publication (Translation of PCT Application) No. JP-T-2014-080508

SUMMARY OF THE INVENTION

Problems to be Solved by the Invention

However, the above-described technique of Patent Document 1 is insufficient in terms of user-friendliness in various usage environments and usage situations.

For example, in a case where a plurality of users simultaneously share and use a television receiver which is a display apparatus in Patent Document 1, each user subscribed to a content distributer, or the so-called content provider, is likely to have a subscription such as an available service division that differs from another user. For this reason, each user would need to perform, for example, a login operation every time the content to be viewed is switched, causing a problem of poor user-friendliness.

An object of the present invention is to provide a technique in which content and the like can be efficiently provided when a display apparatus is shared with utilizing a plurality of terminal apparatuses, even if the service divisions differ between each user.

The above-described object, other objects and novel features of the present invention will be apparent from the descriptions in the present specification and the attached drawings.

Means for Solving the Problems

A brief summarized description of a representative embodiment according to the invention disclosed in the present application is as follows.

Namely, a representative display apparatus is connected to two or more information terminals via a first network and is connected to a content distribution apparatus via a second network, the content distribution apparatus configured to distribute content.

This display apparatus includes an information controller, a content controller, an aggregated content generator and a first display. The information controller sends each piece of login information entered from the two or more information terminals to a content distribution apparatus. The content controller obtains pieces of content list information each generated by the content distribution apparatus based on the pieces of login information sent from the content distribution apparatus.

The aggregated content generator generates an aggregated content list in which the pieces of content list information obtained from the content distribution apparatus by the content controller are aggregated. The first display displays the aggregated content list generated by the aggregated content generator.

The content list information is information containing a list of content available for viewing on each of the information terminals connected to the display apparatus via the first network. The aggregated content list is information containing a list of content available for viewing on the two or more information terminals in which the pieces of content list information are aggregated.

In addition, the information controller generates aggregated login information in which the pieces of login information entered from each of the two or more information terminals logging in on a group basis are aggregated, sends the aggregated login information to the content distribution apparatus, receives aggregated service information generated by the content distribution apparatus based on the aggregated login information from the content distribution apparatus, and sends the received aggregated service information to the information terminals.

The aggregated service information sent from the information controller is information indicating an added value obtained when the two or more information terminals log in to the content distribution apparatus on a group basis.

In particular, the aggregated service information received by the information controller includes split payment information as the added value, the split payment information indicating that a viewing fee of the content can be split between the two or more information terminals logged in on a group basis.

Effects of the Invention

A brief description of an effect obtained by the representative embodiment according to the invention disclosed in the present application is as follows.

It is possible to achieve a highly convenient network terminal system.

BRIEF DESCRIPTION OF THE DRAWINGS

FIGS. 8(a)-8(b) are data tables showing an example of user profile information managed by a user profile generator of FIG. 6;

FIGS. 9(a)-9(b) are data tables showing item examples of user authentication information and device authentication information of FIG. 4;

FIGS. 29(a)-29(d) are explanatory drawings showing an example of default settings information of the wireless terminal according to a fourth embodiment;

DETAILED DESCRIPTION OF PREFERRED EMBODIMENTS

Figure 1:
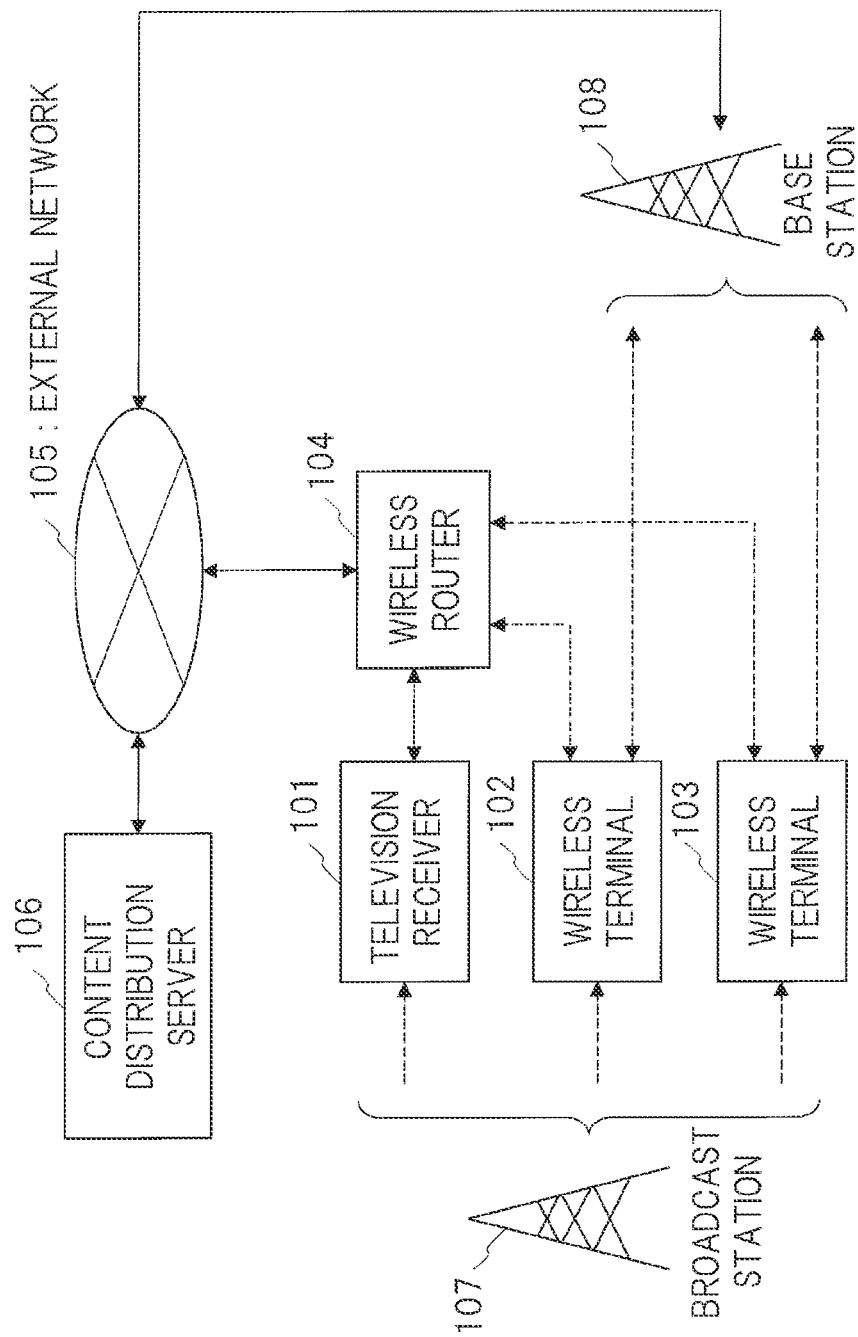
FIG. 1 is a block diagram showing a configuration example of a network terminal system according to a first embodiment.

In the embodiments described below, the invention will be described in a plurality of sections or embodiments if necessary for the sake of convenience. However, these sections or embodiments are not irrelevant to each other unless otherwise clearly specified, and one section or embodiment partially or entirely corresponds to another section or embodiment as a modification, detailed or supplementary description or the like.

In addition, in the embodiments described below, when referring to the number of a component (including number of pieces, numerical value, amount and range), the number is not limited to a specified number and may be less than or greater than this number, unless otherwise clearly specified or unless it is obvious from the context that the number is limited to the specified number in principle.

Further, in the embodiments described below, it goes without saying that each component (including an element step) is not indispensable unless otherwise clearly specified or unless it is obvious from the context that the component is indispensable in principle.

Likewise, in the embodiments described below, when referring to a shape, a positional relation or the like of a component, a substantially approximate shape, a similar shape or the like is included unless otherwise clearly specified or unless it is obvious from the context that the shape, the positional relation or the like of the component differs in principle. The same applies to the above-described numerical value and range.

In addition, in all of the drawings that describe the embodiments, the same members are generally denoted by the same reference symbols, and redundant descriptions are omitted as appropriate.

Hereinafter, embodiments will be described in detail.

First Embodiment

The first embodiment will describe a case where a service (hereinafter referred to as IPTV service) for distributing content such as video images, audio and text information via the internet is used by way of example; however, the present embodiment is not limited to such a case.

<Regarding IPTV Service>

The IPTV service is roughly classified into three modes of services that include streaming, download and progressive download. In streaming, items of content data are successively distributed from a server to a client, and the video image, audio or the like obtained through the data received by the client is played back such that the video image, audio or the like is presented to the user. Thus, streaming is characterized in that the user can view the content on a substantially real-time basis when the network has a sufficiently wide band.

In download, the client obtains and accumulates all items of content data from the server in advance, and after accumulation is completed, playback for viewing is performed. Thus, download is characterized in that the user can receive content distribution even if the network does not have a sufficiently wide band and can view the content several times at desired timings when the content does not need to be viewed on a real-time basis by completing distribution of the content data and accumulating the data in advance.

In addition, in progressive download which is a service between these two services, items of content accumulated in the terminal can be successively viewed before distribution of all items of content is completed. In this manner, it is not always necessary to wait for the accumulation to complete, so that it is possible to provide an advantage in which the accumulation time is shortened even if the network does not have a sufficiently wide band. In addition, it is possible to provide an advantage in which the user can view the content several times at desired timings after the accumulation is completed.

In the content distribution service including the IPTV service, a compensation fee is usually charged by a service provider to the user for receiving the distribution service. At this time, the user is registered as an authorized user in advance, and various pieces of information such as a password, name and street address are managed by using an identifier such as an ID as a clue. Note that the password may be biometric information such as a fingerprint.

In a case where a for-pay content is distributed, it is possible to record billing information at the time of accumulation or viewing, and it is confirmed that payment of the compensation fee is possible through a separately designated payment method.

At a stage of using the distribution service, the identifier such as an ID (IDentification) of registration information and the password needs to be verified with management information in order to receive user authentication and make the service available. The authenticated authorized user is usually provided with a content viewing portal screen for selecting and searching the content to be distributed and for selecting other services such as information distribution.

In addition, device authentication is usually performed via a communication prior to the distribution service in order to confirm whether or not the device used by the user is a device recommended by the service provider, confirm whether or not the program received by the distribution service operating in the device is a recommended program, or the like. In this manner, illegal behavior such as unauthorized copying, transferring and modifying which violate laws such as the Copyright Act and unauthorized usage of the content are prevented.

At this time, the content may be encrypted in advance by a common key cryptosystem, and a key for decrypting the encrypted key may be associated with the received content and be separately maintained such that the encrypted key can be decrypted by an authenticated authorized user, an authenticated authorized connection device or an authorized connection device in which an authorized user is authenticated.

In addition, a public key and a private key may be prepared on the connection device side or the service provider with utilizing a public key cryptosystem. The private key may be sent to the connection device during user registration and be utilized for encrypting and decrypting keys in each of the service provider and connection device.

Generally, these keys for decrypting are recorded together with playback conditions such as an expiration date of the content, number of times the content can be played back and the user and device capable of playing back the content. Hereinafter, the key for encrypting will be referred to as an encryption key, and the key for decrypting will be referred to as a decryption key.

In this manner, the IPTV service provider serving as a content or service provider associates user authentication, device authentication and decryption keys to one another in order to safely provide the content distribution service and the like to users and reliably charge the fee.

Thereafter, the user receives distribution of the desired content and correctly receives services such as content playback. Further, in this regard, there may be a case where the user is allowed to maintain the content associated so as to comply with a right for playback corresponding to the copyright of the content.

The user performs playback of the content on a predetermined device with utilizing the content and decryption key obtained in such a manner; however, this is performed under the presumption that the same apparatus is used by the same user.

On the other hand, in a case where the same user possesses a plurality of apparatuses and wishes to play back the same content on a different apparatus, there is an inconvenience in that a fee for the same content is charged again.

For this reason, there is a service that allows the content to be played back on a number of devices within a range permitted by the service provider if the right for playback is held by the same user.

In addition, there is also a service in which a function of an application software purchased and downloaded as in the case of the content is acquired by running the application software in the device. As in the case of the content, there is also a service that allows an authenticated authorized user to download an application to a number of devices within a range permitted by the service provider if the right for download is held by the same user.

<Configuration Example of Network Terminal System>

FIG. 1 is a block diagram showing a configuration example of a network terminal system according to the first embodiment.

As shown in FIG. 1, the network terminal system includes, for example, a television receiver 101, a wireless terminal 102, a wireless terminal 103, a wireless router 104, an external network 105 and a content distribution server 106.

FIG. 1 shows an example in which each user of the wireless terminal 102 and wireless terminal 103 views a television program on the television receiver 101 at home, in a store or the like. Each of the wireless terminals 102 and 103 is an information terminal and is constituted by a mobile communication terminal such as a mobile telephone.

At this time, it is assumed that the network terminal system shown in FIG. 1 is temporarily constructed when, for example, the user of the wireless terminal 103 visits the house of the user of the wireless terminal 102. Note that FIG. 1 shows an example in which the two wireless terminals 102 and 103 are utilized; however, the number of wireless terminals is not limited to this number and may be three or more.

The wireless router 104 comprises a wireless LAN (Local Area Network) function such as Wi-Fi (registered trademark) and can be connected to the external network 105 via a communication line. The communication line such as wireless LAN is a first network, and the external network 105 is a second network.

In addition, the wireless router 104 is connected to the television receiver 101, the wireless terminal 102, the wireless terminal 103 and the external network 105. The television receiver 101, the wireless terminal 102 and the wireless terminal 103 can obtain information via an internet network.

In addition, the wireless router 104 is connected to the television receiver 101 via wired or wireless LAN and is connected to the wireless terminal 102 or the wireless terminal 103 via wireless LAN. Here, Wi-Fi refers to wireless LAN standards defined in "IEEE 802.11a/IEEE 802.11b" standards by the IEEE (Institute of Electrical and Electronics Engineers of U.S.A.).

The content distribution server 106 which is a content distribution apparatus is a content management apparatus configured to accumulate content such as movies and audio and distribute the content in response to a request of the television receiver 101, the wireless terminal 102 or the wireless terminal 103 connected to the network.

The content distribution server 106 is connected to the external network 105. The television receiver 101, the wireless terminal 102 and the wireless terminal 103 can send and receive information to and from the content distribution server 106 via the wireless router 104 and can receive information regarding the content such as the content itself and the key for decrypting the encrypted content.

In addition, each of the wireless terminals 102 and 103 is connected to a communication network via a base station 108 by using the mobile communication network, so that the wireless terminals can send and receive information and can receive the content via the external network connected to the communication network.

<Hardware Configuration of Television Receiver>

Next, a configuration of the television receiver 101 will be described.

Figure 2:
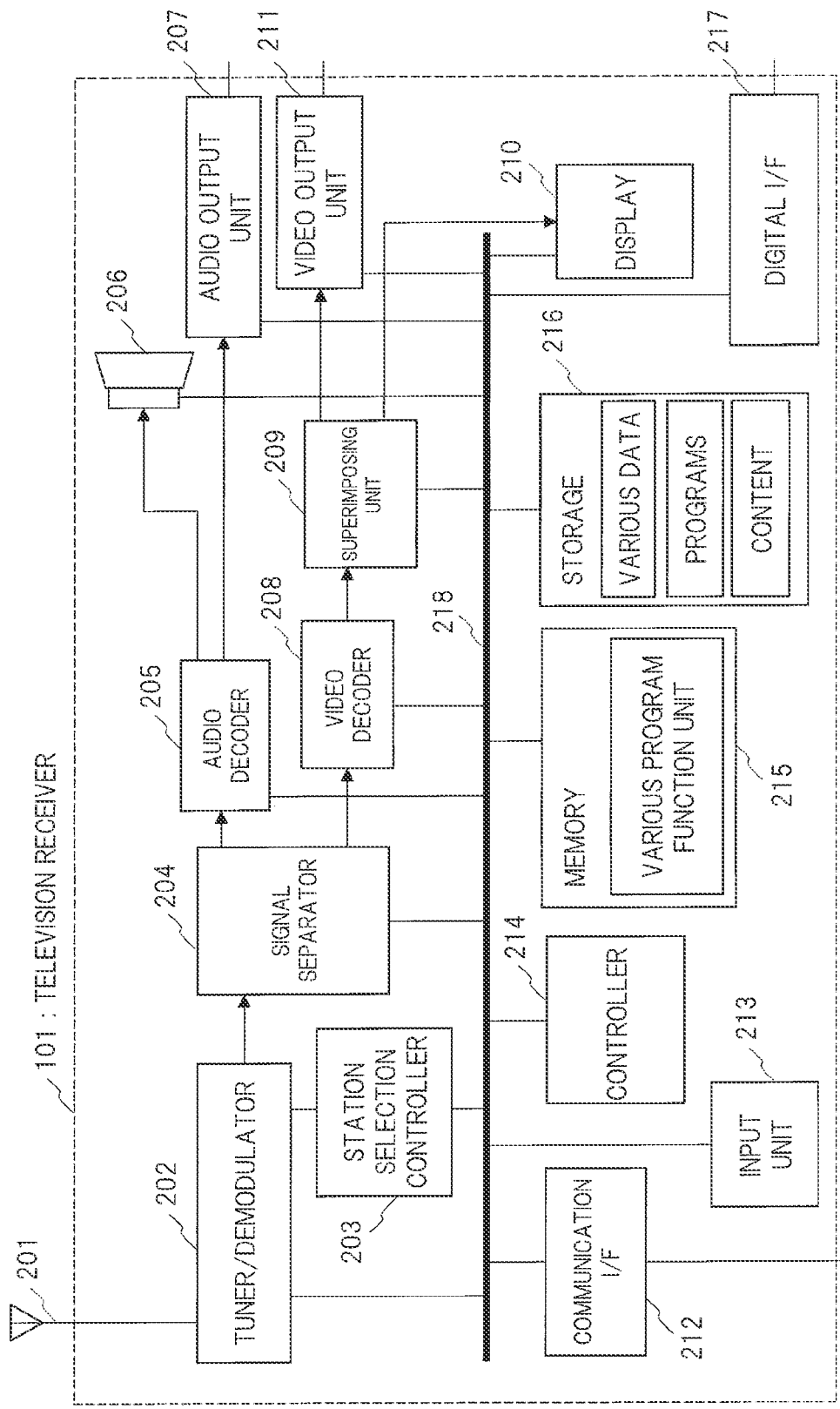
FIG. 2 is an explanatory drawing showing a configuration example of a television receiver within the network terminal system of FIG. 1.

FIG. 2 is an explanatory drawing showing a configuration example of the television receiver 101 within the network terminal system of FIG. 1.

The television receiver 101 which is the display apparatus is connected to an antenna 201. The television receiver 101 includes a tuner/demodulator 202, a station selection controller 203, a signal separator 204, an audio decoder 205, a speaker 206, an audio output unit 207, a video decoder 208, a superimposing unit 209, a display 210, a video output unit 211, a communication I/F (interface) 212, an input unit 213, a controller 214, a memory 215, a storage 216, a digital I/F 217 and the like. Each of these function blocks is connected to one another via a bus 218.

Various operation functions of the television receiver 101 are achieved by application programs. The application programs are stored in the storage 216, and the controller 214 applies these programs from the storage 216 to the memory 215. Further, the controller 214 executes the application programs to achieve various functions.

In the description below, the various functions achieved by the controller 214 executing the application programs will be described as being achieved mainly by "various program function units" applied to the memory 215 for the sake of clarity.

The application programs may be stored in the storage 216 in advance by the time of shipping the television receiver 101. Alternatively, the application programs may be stored in an optical medium such as a CD (Compact Disk) or a DVD (Digital Versatile Disk) or a medium such as a semiconductor memory and may be installed in the television receiver 101 via a medium connection unit (not shown).

In addition, the application programs may be downloaded and installed from the external network 105 via the communication I/F 212 and wireless router 104. Note that the various functions of the above-described application programs can also be achieved by hardware serving as processors having the same functions. In a case where the application programs are achieved by the hardware, each function is achieved mainly by the corresponding processor.

The input unit 213 is an input device configured to accept the user's input operation of the television receiver 101 and corresponds to a remote controller, a keyboard and a pointing device such as a mouse.

The controller 214 receives the user's input operation via the input unit 213 and controls each processor such as the station selection controller 203, the signal separator 204, the superimposing unit 209, the memory 215 which is the various program function unit, the storage 216, the communication I/F 212 and the digital I/F 217.

The tuner/demodulator 202 is controlled by the station selection controller 203 and is tuned to a channel of the desired service. A desired digital broadcast signal received from a broadcast station 107 of FIG. 1 via the antenna 201 is selected and demodulated to generate a transport stream.

The station selection controller 203 receives an instruction for selecting the service via the input unit 213 and controls the tuner/demodulator 202 such that the channel is switched to the selected channel. In addition, according to an instruction from the various program function unit, the station selection controller 203 controls the tuner/demodulator 202 such that the service is switched to a service (channel number) currently broadcasting an event (program) and to a broadcast presentation unit within this service.

The communication I/F 212 is connected to the wireless router 104 via wired or wireless LAN. The communication I/F 212 sends and receives various pieces of information to and from the wireless terminal 102 or the wireless terminal 103 via the wireless router 104.

In addition, the communication I/F 212 can send and receive various pieces of information to and from another apparatus connected to the external network 105 via the wireless router 104. For example, content streams including video/audio streams can be received in a format such as IP broadcast or video-on-demand from the content distribution server 106 and the like connected to the external network 105. The controller 214 and the communication I/F 212 become information controllers, content controllers and aggregated content generators.

Video/audio streams and application programs can be downloaded from the content distribution server 106 and the like connected to the external network 105. The downloaded data or information is stored in, for example, the storage 216.

In addition to or instead of the function for communicating with the wireless router 104, it is possible to directly communicated with an external device by a technique such as wireless LAN including Wi-Fi, IrDA (registered trademark), Bluetooth (registered trademark) or NFC (Near Field Communication), without the wireless router 104 interposed therebetween.

The communication I/F 212 may be provided with a chip configured to perform each communication scheme. Alternatively, the communication I/F 212 may be provided with a single chip configured to handle a plurality of communication schemes.

Hereinafter, an example in which the communication I/F 212 sends and receives various pieces of information to and from the wireless terminal 102 or the wireless terminal 103 via the wireless router 104 will be described; however, the communication I/F 212 may directly send and receive various pieces of information without the wireless router 104 interposed therebetween as described above.

The signal separator 204 separates the transport streams obtained by the tuner/demodulator 202 and the content streams obtained via the communication I/F 212 into video data, audio data, subtitle text data, program information and the like according to each type.

In addition, the signal separator 204 includes a function for obtaining program information such as program arrangement information (SI) and sending the program information to other processing blocks. In a case where a data send request is received from another processor, the signal separator 204 sends the designated data to the requesting source.

The audio decoder 205 decodes audio data separated by the signal separator 204. Audio information decoded by the audio decoder 205 is outputted from the speaker 206. The audio information decoded by the audio decoder 205 may be outputted from the audio output unit 207 to an external device.

The video decoder 208 decodes the video data separated by the signal separator 204. Video information decoded by the video decoder 208 is sent to the superimposing unit 209.

The superimposing unit 209 superimposes an EPG (Electronic Program Guide) image created by the various program function unit, an OSD (On Screen Display) image, images generated from various pieces of information (such as subtitle information, superimposed subtitles and data of data broadcast) separated by the signal separator 204, and the like on the decoded video information sent from the video decoder 208. The various pieces of information are, for example, the subtitle information, superimposed subtitles or data of data broadcast.

In addition, the superimposing unit 209 synthesizes a browser display screen created by a browser engine 502 described below and a video signal or selectively switches between the browser display screen and the video signal. The video information having passed through the superimposing unit 209 is displayed on the display 210 which is the first display.

The display 210 is constituted by a television, a personal computer display, a liquid crystal panel or the like, and displays broadcasted/distributed video images, a UI for performing various operations, a web browser, images stored in the storage 216 or the like.

The video information having passed through the superimposing unit 209 may be outputted from the video output unit 211 to an external device. The image or video image to be displayed may be an image generated by an application program or may be an image or video image of the content received via the tuner/demodulator 202. Alternatively, the image or video image may be an image or video image received from a server on the external network 105 via the communication I/F 212 or may be an image or video image received from the wireless terminal 102 or the wireless terminal 103 via the communication I/F 212.

In addition, the transport streams of a predetermined program may be separated by the signal separator 204, and the digital I/F 217 configured to output a video image or an audio without decoding the video image or the audio may be provided.

The storage 216 stores the application programs and various pieces of information created by the application programs. In addition, the content such as video/audio stream can be stored from a signal received by the tuner/demodulator 202 or the communication I/F 212. The function units of the application programs stored in the storage 216 are applied to the memory 215 is applied by controls of the controller 214.

The image or video image to be displayed on the display 210 can be any one of an image generated by the application program, an images or video image of the content received via the tuner/demodulator 202, an image or video image received from the content distribution server 106 on the external network 105 via the communication I/F 212, and an image or video images received from the wireless terminals 102 and 103 via the communication I/F 212.

Here, an example using the television receiver will be described; however, a configuration using a recorder in which the display and speaker are omitted may be applied such that similar video images and audio are presented through the externally connected television receiver, display or speaker.

In addition, the television receiver 101 can be replaced with an STB (Set-Top Box), a recorder or the like, and in this case, the speaker 206 and the display 210 can be omitted from the configuration of the television receiver of FIG. 2.

In addition, the present embodiment can also be applied to a monitor apparatus, a large tablet terminal, an interactive whiteboard or the like comprising the above-described commmunication I/F. In this case, the antenna 201, the tuner/demodulator 202, the station selection controller 203 and the signal separator 204 can be omitted from the configuration of the television receiver of FIG. 2.

<Hardware Configuration of Wireless Terminal>

Next, a configuration of the wireless terminal 102 will be described.

Figure 3:
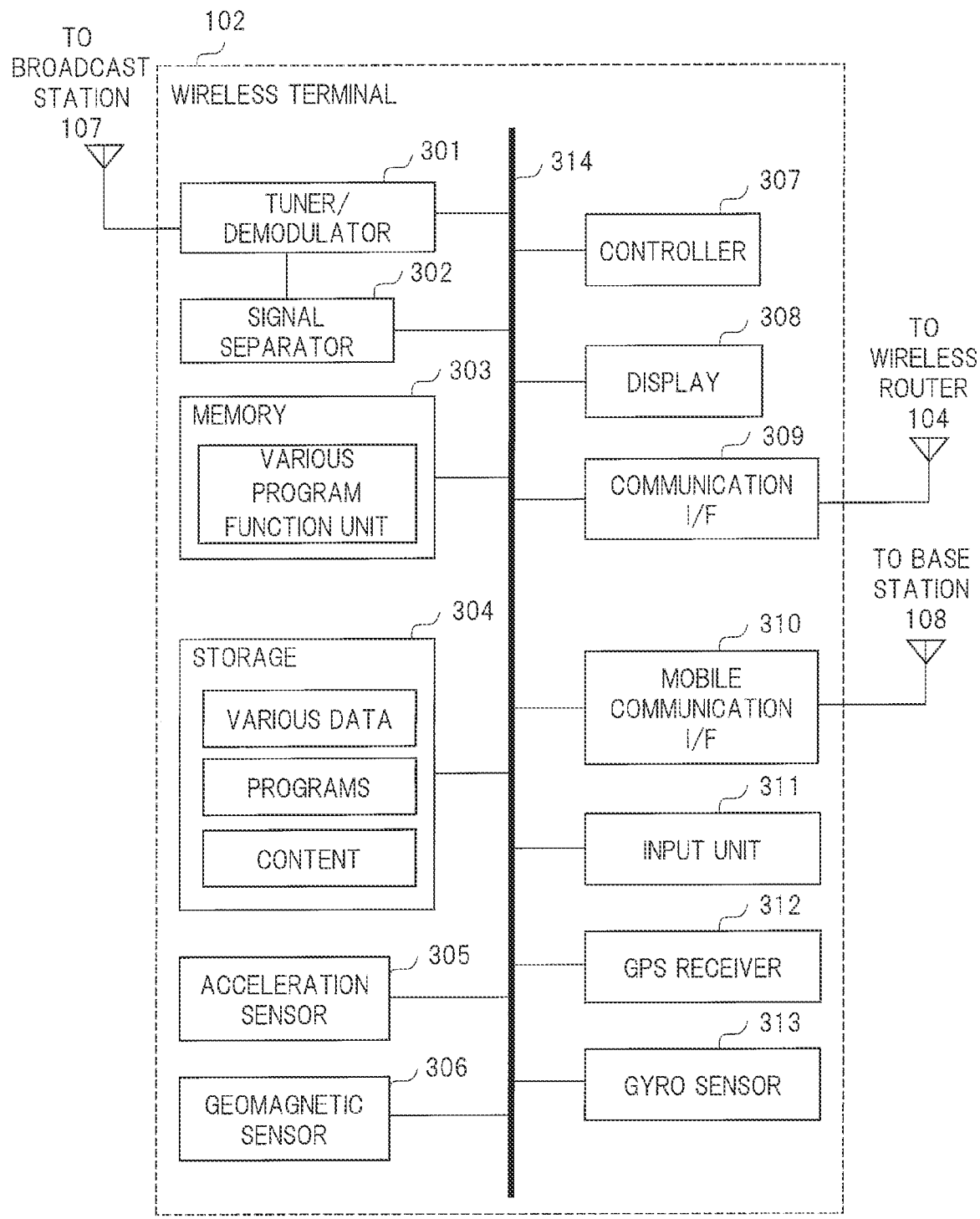
FIG. 3 is an explanatory drawing showing a configuration example of a wireless terminal within the network terminal system of FIG. 1.

FIG. 3 is an explanatory drawing showing a configuration example of the wireless terminal 102 within the network terminal system of FIG. 1.

In FIG. 3, the configuration of the wireless terminal 102 will be described; however, a configuration of each unit of the wireless terminal 103 is the same as those of the wireless terminal 102, and thus, redundant descriptions will be omitted.

The wireless terminal 102 includes a tuner/demodulator 301, a signal separator 302, a memory 303, a storage 304, an acceleration sensor 305, a geomagnetic sensor 306, a controller 307, a display 308, a communication I/F 309, a mobile communication I/F 310, an input unit 311, a GPS receiver 312 and a gyro sensor 313. These function blocks are connected to one another via a bus 314.

The wireless terminal 102 stores application programs in the storage 304. The controller 307 applies the application programs from the storage 304 to the memory 303 and executes the application programs to achieve various functions.

In the description below, the various functions achieved by the controller 307 executing the application programs will be described as being achieved mainly by "various program function units" applied to the memory 303 for the sake of clarity.

The application programs may be stored in the storage 304 in advance by the time of shipping the wireless terminal 102. Alternatively, the application programs may be stored in an optical medium such as a CD (Compact Disk) or a DVD (Digital Versatile Disk) or a medium such as a semiconductor memory and may be installed in the wireless terminal 102 via a medium connection unit (not shown).

In addition, the application programs may be downloaded and installed from the external network 105 via the communication I/F 309 and wireless router 104. Alternatively, the application programs may be downloaded and installed from the base station 108 which is a distribution source via the mobile communication I/F 310.

In addition, a personal computer having application programs obtained via the network can be connected to the wireless terminal 102 via an external device connection I/F (not shown), so that the application programs can be moved or copied from the personal computer and be installed to the wireless terminal 102.

Note that the various functions of the application programs can also be achieved by hardware serving as processors having the same functions. In the case where the application programs are achieved by the hardware, each function is achieved mainly by the corresponding processor.

The tuner/demodulator 301 and the signal separator 302 respectively have the same functions as those of the tuner/demodulator 202 and signal separator 204 shown in FIG. 2. These functions have already been described, and thus, redundant descriptions will be omitted.

The communication I/F 309 serving as a transmitter and receiver sends and receives various pieces of information to and from the communication I/F 212 of the television receiver 101 of FIG. 2 via the wireless router 104 of FIG. 1 by wireless LAN. In addition, the communication I/F 309 is connected to the external network 105 via the wireless router 104 and sends and receives various pieces of information to and from the content distribution server 106 and the like on the external network 105.

For example, content streams including video/audio streams can be received in a format such as IP broadcast or video-on-demand from the content distribution server 106 and the like connected to the external network 105 as in the above-described television receiver 101.

In addition, video streams and application programs can be downloaded from the content distribution server 106 and the like connected to the external network 105. The downloaded data or information is stored in, for example, the storage 304.

In addition to or instead of the function for communicating with the wireless router 104, it is possible to directly communicate with the television receiver 101 or another device by a technique such as wireless LAN including Wi-Fi, IrDA, Bluetooth or NFC, without the wireless router 104 interposed therebetween.

The communication I/F 309 may be provided with a chip configured to perform each communication scheme. Alternatively, the communication I/F 309 may be provided with a single chip configured to handle a plurality of communication schemes.

The mobile communication I/F 310 is connected to the communication network via the base station 108 by using a mobile communication network such as a third generation mobile communication system (hereinafter referred to as "3G") or an LTE (Long Term Evolution) scheme and can send and receive information to and from the server on the communication network.

The third generation mobile communication system includes, for example, a GSM (Global System for Mobile Communications) scheme, a W-CDMA (Wideband Code Division Multiple Access) scheme, a CDMA2000 scheme or a UMTS (Universal Mobile Telecommunications System) scheme.

The controller 307 receives the user's operation request via the input unit 311 and controls the signal separator 302, the memory 303 which is the various program function unit, the display 308 and the communication I/F 309.

In addition, the controller 307 can obtain various pieces of information, content or application programs from the external network 105 via the communication I/F 309 and wireless router 104 or from the communication network via the mobile communication I/F 310 and base station 108, and has a function for passing the various pieces of information, the content or the application programs to the various program function unit.

The storage 304 stores the application programs and various pieces of information created by the application programs. In addition, the storage 304 can store content such as video/audio streams from signals received from the tuner/demodulator 301, the communication I/F 309 or the mobile communication I/F 310.

The function units of the application programs stored in the storage 304 are applied to the memory 303 by controls of the controller 307. The display 308 which is a second display displays images and video images stored in the storage 304, broadcasted/distributed video images, a UI for performing various operations, a browser or the like. The display 308 may be integrally formed with a touch panel described below or the like.

The image or video image to be displayed is an image generated by an application program, an image or video image of the content received via the tuner/demodulator 301, an image or video image received from the content distribution server 106 on the external network 105 via the communication I/F 309, or the like. Alternatively, the image or video image to be displayed can be an image or video image received from the television receiver 101 via the communication I/F 309, an image or video image distributed from the server on the communication network via the mobile communication I/F 310, or the like.

The input unit 311 is an input device configured to accept the user's input operation of the wireless terminal 102 and can utilize a physical button, a touch panel or the like. Hereinafter, an example in which the touch panel is used will be described; however, the various operations may be configured so as to utilize a physical button.

An object or the like such as an icon can be freely moved by a drag operation or a flick operation utilizing the touch panel. The drag operation is an operation in which a selected object on the touch panel is moved in a state where the object is continuously touched by a finger. The flick operation is an operation in which the selected object on the touch panel is moved by moving the finger so as to flick the screen.

In addition, the object such as the icon can be activated or the screen can be switched to another screen by performing an operation (tap operation) in which an object is tapped once by the finger or an operation (double tap operation) in which an object is tapped twice. Hereinafter, each operation performed on the above-described touch panel will be referred to as a drag operation, a flick operation and a tap operation.

The acceleration sensor 305 measures an acceleration applied to the wireless terminal 102. The controller 307 measures, for example, an acceleration of gravity by the acceleration sensor 305. By measuring the acceleration of gravity, an upper side of the wireless terminal 102 can be determined.

As a result, the screen displayed on the display 308 can be displayed such that an upper side of the screen is aligned with the upper side measured by the acceleration sensor 305, and thus, the screen can be displayed according to how the user is holding the wireless terminal 102.

The geomagnetic sensor 306 measures geomagnetism by using a plurality of magnetic sensors or the like. The GPS receiver 312 receives signals sent from a plurality of satellites by using GPS (Global Positioning System).

The controller 307 can calculate position information of the wireless terminal 102 based on the signals received by the GPS receiver 312. The gyro sensor 313 measures an angular velocity of the wireless terminal 102 generated in a case where the user moves the wireless terminal 102.

<Hardware Configuration of Content Distribution Server>

Figure 4:
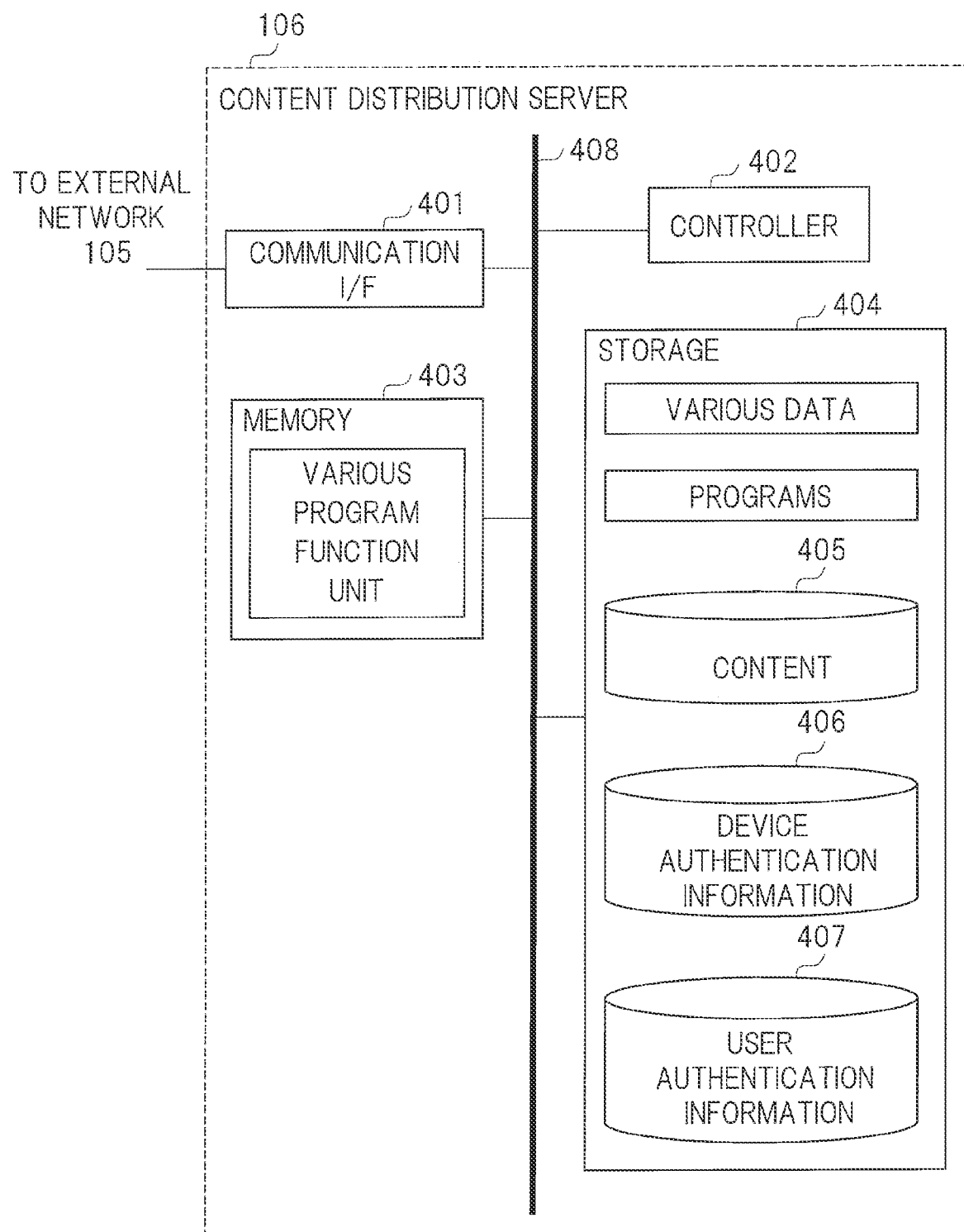
FIG. 4 is an explanatory drawing showing a configuration example of a content distribution server within the network terminal system of FIG. 1.

FIG. 4 is an explanatory drawing showing a configuration example of the content distribution server 106 within the network terminal system of FIG. 1.

The content distribution server 106 is constituted by a communication I/F 401, a controller 402, a memory 403 and a storage 404. These function blocks are connected to one another via a bus 408.

The content distribution server 106 stores application programs in the storage 404. The controller 402 applies the application programs from the storage 404 to the memory 403 and executes the application programs to achieve various functions.

In the description below, the various functions achieved by the controller 402 executing the application programs will be described as being achieved mainly by "various program function units" applied to the memory 403 for the sake of clarity.

The communication I/F 401 is connected to the external network 105, is connected to the wireless router 104 via the external network 105, and sends and receives various pieces of information to and from the communication I/F 212 of the television receiver 101 and the communication I/F 309 of the wireless terminal 102 or wireless terminal 103.

In addition, the communication I/F 401 can send and receive various pieces of information to and from the mobile communication I/F 310 of the wireless terminal 102 or wireless terminal 103 from the communication network via the base station 108.

The controller 402 controls the communication I/F 401, the memory 403 and the storage 404. In addition, the controller 402 also has a function for passing content accumulated in a content 405 of the storage 404 to the television receiver 101, the wireless terminal 102 or the wireless terminal 103 via the communication I/F 401, the external network 105 or the base station 108.

The storage 404 stores the application programs and various pieces of information created by the application programs. In addition, the storage 404 also has a function configured to accumulate the content 405, device authentication information 406, user authentication information 407 and the like.

The function units of the application programs stored in the storage 404 are applied to the memory 403 which is the various program function unit by controls of the controller 402.

<Software Configuration Example of Television Receiver>

Figure 5:
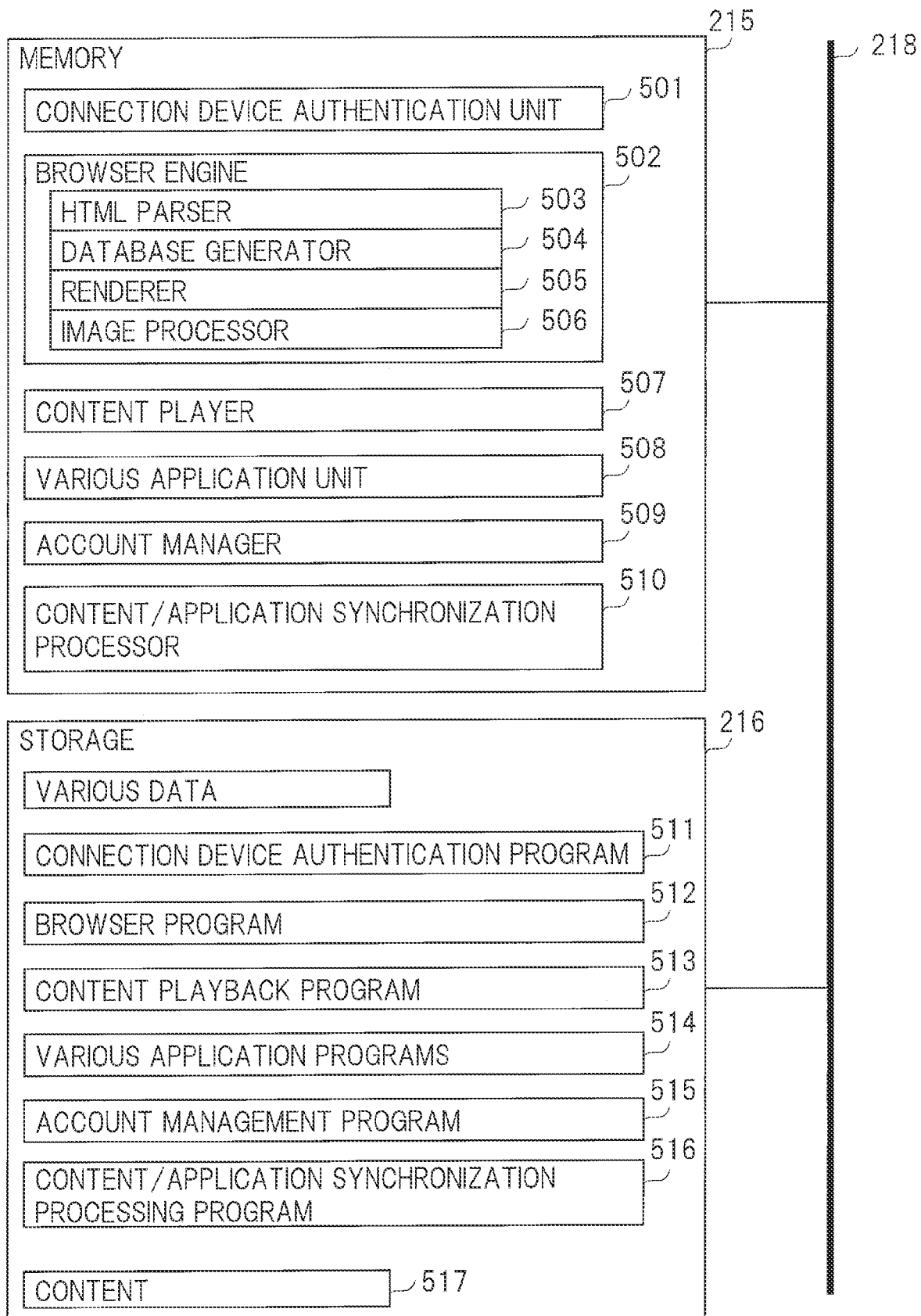
FIG. 5 is an explanatory drawing showing configuration examples of a memory and a storage within the television receiver of FIG. 2.

FIG. 5 is an explanatory drawing showing configuration examples of the memory 215 and the storage 216 within the television receiver 101 of FIG. 2.

In FIG. 5, the storage 216 stores a connection device authentication program 511, a browser program 512, a content playback program 513, various application programs 514, an account management program 515 and a content/application synchronization processing program 516.

These programs are applied to the memory 215 by the controller 214, and the controller 214 executes the applied programs to achieve functions of a browser engine 502, a connection device authentication unit 501, a content player 507, a various application unit 508, an account manager 509 and a content/application synchronization processor 510.

The connection device authentication program 511, the browser program 512, the content playback program 513, the various application programs 514, the account management program 515 and the content/application synchronization processing program 516 are stored in the storage 216 by the time of shipping the product. Alternatively, these programs may be downloaded via the communication I/F 212.

In the description below, the various functions achieved by the controller 214 executing these programs will be described as being achieved mainly by each function unit in the memory 215 for the sake of clarity.

The browser engine 502 is constituted by each function block of an HTML parser 503, a database generator 504, a renderer 505 and an image processor 506.

The HTML parser 503 analyzes a logical structure of HTML (HyperText Markup Language) data obtained via the controller 214. In addition, the HTML parser 503 renders the obtained HTML data and converts the HTML data into internal data to be used in the television receiver 101.

The database generator 504 generates a database related to this HTML data structure. The renderer 505 generates a layout structure including information of an expression format determined by each tag based on the database and generates a browser display screen matching the data in which size, position and image based on this layout structure are imported.

The image processor 506 converts the obtained image file into image data of a bitmap format or the like based on image file information such as an image file name and an arrangement of an image file designated by an image tag in the HTML data.

The authentication information such as the user ID and the password obtained from various data in the storage 216 of the television receiver 101 is compared with the authentication information sent from a connection device authentication unit 601 of the wireless terminal 102 or wireless terminal 103 by the connection device authentication unit 501. If the pieces of authentication information match, the connection device authentication unit 501 permits connection of the connection device authentication unit 601 of the wireless terminal 102. On the other hand, if the pieces of authentication information do not match, the connection device authentication unit 501 does not authenticate the connection of the connection device authentication unit 601 of the wireless terminal 102.

The authentication information stored in the various data of the storage 216 of the television receiver 101 is entered by the user with utilizing the input unit 213 or is set in advance before the time of shipping the television receiver 101 from a factory.

In addition, the above-described authentication information can be displayed on the display 210 by the user's operation or can be confirmed by the user based on documents and the like attached to the product when the user purchased the television receiver 101. Further, a username and MAC address of the wireless terminal 102 or wireless terminal 103 may be stored in the storage 216 of the television receiver 101, a non-volatile memory (not shown) or the like as the authentication information of the connection device.

The above is an example of an authentication method, and in a case where, for example, the television receiver 101 is connected to the wireless terminal 102 or the wireless terminal 103 via wireless LAN, an authentication/encryption method which uses an SSID (Service Set Identifier) and a WEP (Wired Equivalent Privacy) key or a WPS (Wi-Fi Protected Setup) key can be utilized. The authentication method, the encryption method for encrypting information sent and received when authentication succeeds, and the like may use a known technique and are not limited to specific methods.

In addition, in a case where the wireless terminal is operated such that the distribution of the content for viewing is received from the content server 106 by the television receiver 101, the connection device authentication unit 501 has a function configured to send the authentication information stored in the various data to a user manager 701 of the content distribution server 106 via the communication I/F 212 and wireless router 104.

At this time, the device authentication information sent to the content distribution server 106 is associated with user information of user profile information generated by a user profile generator 609 of the wireless terminal 102 or wireless terminal 103. In addition, the device authentication information can be separately managed as information recognizable by the content distribution server 106.

The content player 507 receives the content data and content information of a movie, TV drama or the like distributed from the content distribution server 106 via the external network 105 and plays back the successively received video images, audio and the like to present to the user.

Here, a case of distribution and playback of the content by streaming will be described; however, as described below, there may be a download service in which the entire content data is obtained from the server and accumulated in advance and the content is played back for viewing after accumulation is completed. In this case, the content data is stored in a content 517 of the storage 216.

Information of a playback stop position of the content can be stored as resume information in the various data of the storage 216. In a case where playback of the same content is resumed by the same user, data of the playback stop position can be obtained from the resume information and be used as a playback start position. The resume information is set per user by referring to the user profile information obtained from the wireless terminals 102 and 103.

The various application unit 508 indicates applications such as the browser engine 502 and the content player 507 shown in FIG. 5 as well as applications downloaded from the content distribution server 106 according to the user's preference. Each application receives the user's operation from the input unit 213 and is activated by a tap operation performed on an application activation icon displayed on the display 210.

After authentication of the wireless terminal 102 or wireless terminal 103 by the connection device authentication unit 501 is completed, the account manager 509 sets the authenticated wireless terminal 102 or the wireless terminal 103 as an authenticated user account.

In addition, when the user profile information generated by the wireless terminal 102 or the wireless terminal 103 is obtained, the user account and the user profile are associated with the corresponding user ID based on the user profile information, and are registered and managed therein.

In addition, the account manager 509 can simultaneously accept and independently manage a plurality of user accounts. In a case where simultaneous actions are available, operation by each user account is permitted, and in a case where simultaneous actions are not available and an exclusive action is necessary, the user information of the wireless terminal currently used by a user is sent to the wireless terminal used by the next user, so that the right for usage of the television receiver 101 can be transferred or information regarding the remaining usage time or the like can be requested.

The content/application synchronization processor 510 refers to the user profile of each wireless terminal, compares the type of application downloaded to the wireless terminal 102 or the wireless terminal 103 and the type of application downloaded to the television receiver 101, and confirms for consistency based on device type information described below.

Further, if the applications between the wireless terminal and the television receiver do not match, the applications of the wireless terminal and the television receiver can be synchronized by downloading the absent application.

In addition, applications regarding the downloaded content of the wireless terminal and the television receiver can be synchronized by downloading as in the above-described case. Further, in a case where an application or content is downloaded, a message for confirmation may be displayed on the display 210 such that whether or not to download the application or the content can be selected by the input unit 213.

<Software Configuration Example of Wireless Terminal>

Figure 6:
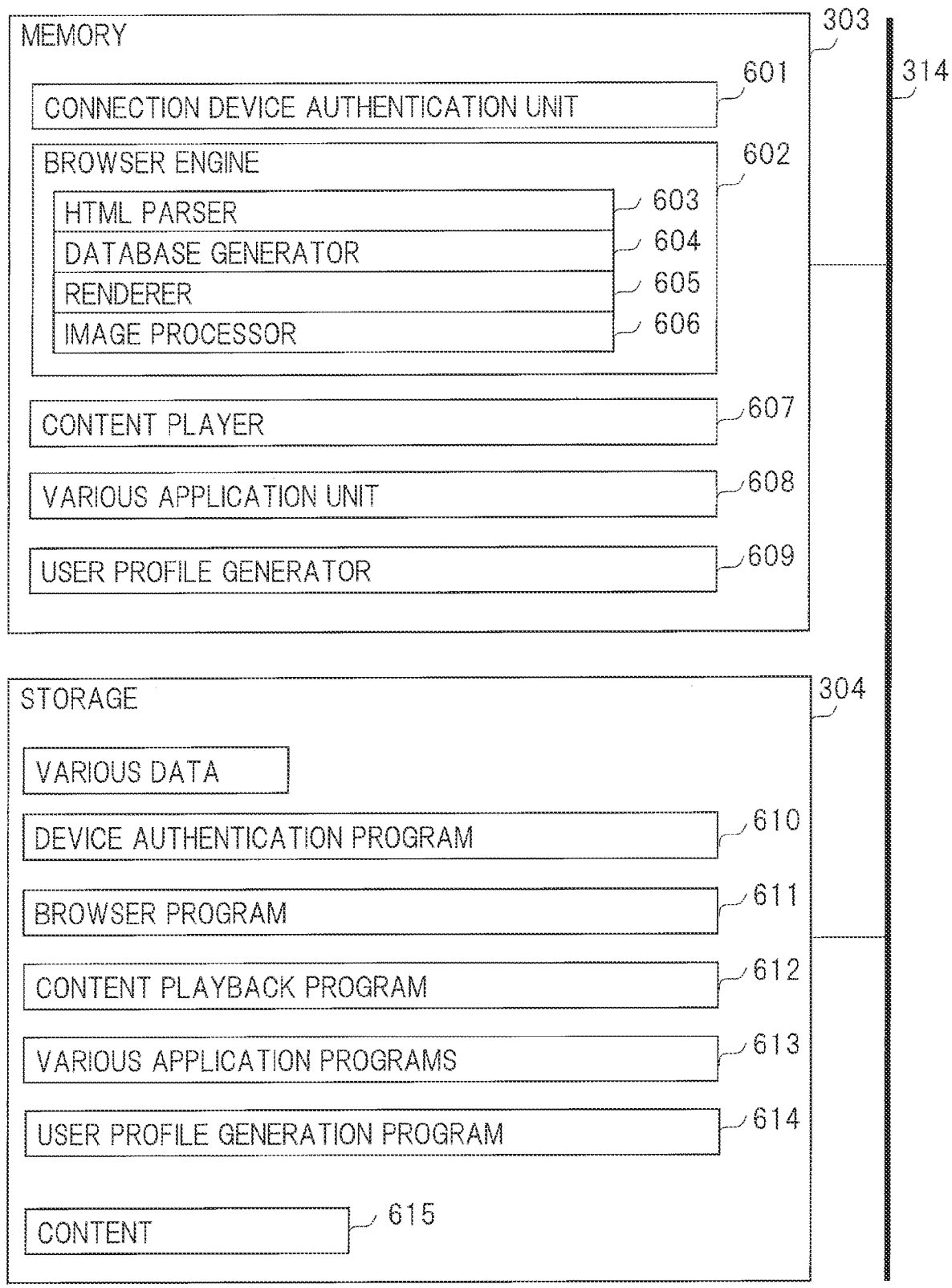
FIG. 6 is an explanatory drawing showing configuration examples of a memory and a storage within the wireless terminal of FIG. 3.

FIG. 6 is an explanatory drawing showing a configuration example of the memory 303 and the storage 304 within the wireless terminals 102 and 103 of FIG. 3.

As shown in FIG. 6, the storage 304 stores a device authentication program 610, a browser program 611, a content playback program 612, various application programs 613 and a user profile generation program 614.

These programs are applied to the memory 303 by the controller 307, and the controller 307 executes the programs to achieve functions of the connection device authentication unit 601, a browser engine 602, a content player 607, a various application unit 608 and the user profile generator 609.

The device authentication program 610, the browser program 611, the content playback program 612, the various application programs 613 and the user profile generation program 614 are stored in the storage 304 by the time of shipping the product. Alternatively, these programs may be downloaded via the communication I/F 309 or mobile communication I/F 310.

In the description below, the various functions achieved by the controller 307 executing these programs will be described as being achieved mainly by the program function unit in the memory 303 for the sake of clarity.

As in the browser engine 502 of the television receiver 101, the browser engine 602 is constituted by each function block of an HTML parser 603, a database generator 604, a renderer 605 and an image processor 606.

The HTML parser 603, the database generator 604, the renderer 605 and the image processor 606 are the same as those of the browser engine 502 of FIG. 5, and thus, redundant descriptions will be omitted.

In order to receive authentication from the television receiver 101, the connection device authentication unit 601 sends the authentication information of a connection device entered by the user utilizing the input unit 311 and stored in the various data to the connection device authentication unit 501 of the television receiver 101 via the communication I/F 309 and wireless router 104. In a case where a second or subsequent authentication is performed, entering of the authentication information can be skipped by referring to the authentication information of the connection device stored in the various data of the storage 304.

In addition, the connection device authentication unit 601 has a function for sending the authentication information stored in the various data as the authentication information of a content distribution destination to the user manager 701 of the content distribution server 106 described below via the communication I/F 309 or mobile communication I/F 310.

The pieces of authentication information can be managed separately from the user profile information as information associated with the user information of the user profile information generated by the user profile generator 609 and recognizable by the content distribution server 106.

A content player 907 receives the content data and the content information of the movie, TV drama or the like distributed from the content distribution server 106 and the like via the external network 105 or mobile communication I/F 310, and plays back the successively received video images, audio and the like to present to the user.

Here, a case of distribution and playback of the content by streaming will be described; however, as in the embodiment described below, there may be a download service in which the entire content data is obtained from a server and accumulated in advance, and the content is played back for viewing after accumulation is completed. In this case, the content data is stored in the storage 304 as the content 615.

In addition, information of a playback stop position of the content can be stored in the various data of the storage 304 as resume information. In a case where the same content is resumed, data of the playback stop position can be obtained from the resume information and be used as a playback start position. The resume information can be stored in the user profile information.

The various application unit 608 indicates applications such as the browser engine 602 and the content player 607 as well as applications downloaded from the content distribution server 106 according to the user's preference.

Each application receives the user's operation from the input unit 311 and is activated by a tap operation performed on an application activation icon displayed on the display 210.

The user profile generator 609 has a function for generating the user profile information including the user authentication information for receiving authentication from the connection device, information such as a menu set according to the user's preference, and information such as the title of the application installed before purchase or obtained by download purchasing or the like. Setting states changed by the user and information of a newly purchased application or the like are updated to the most recent states.

<Software Configuration Example of Server>

Figure 7:
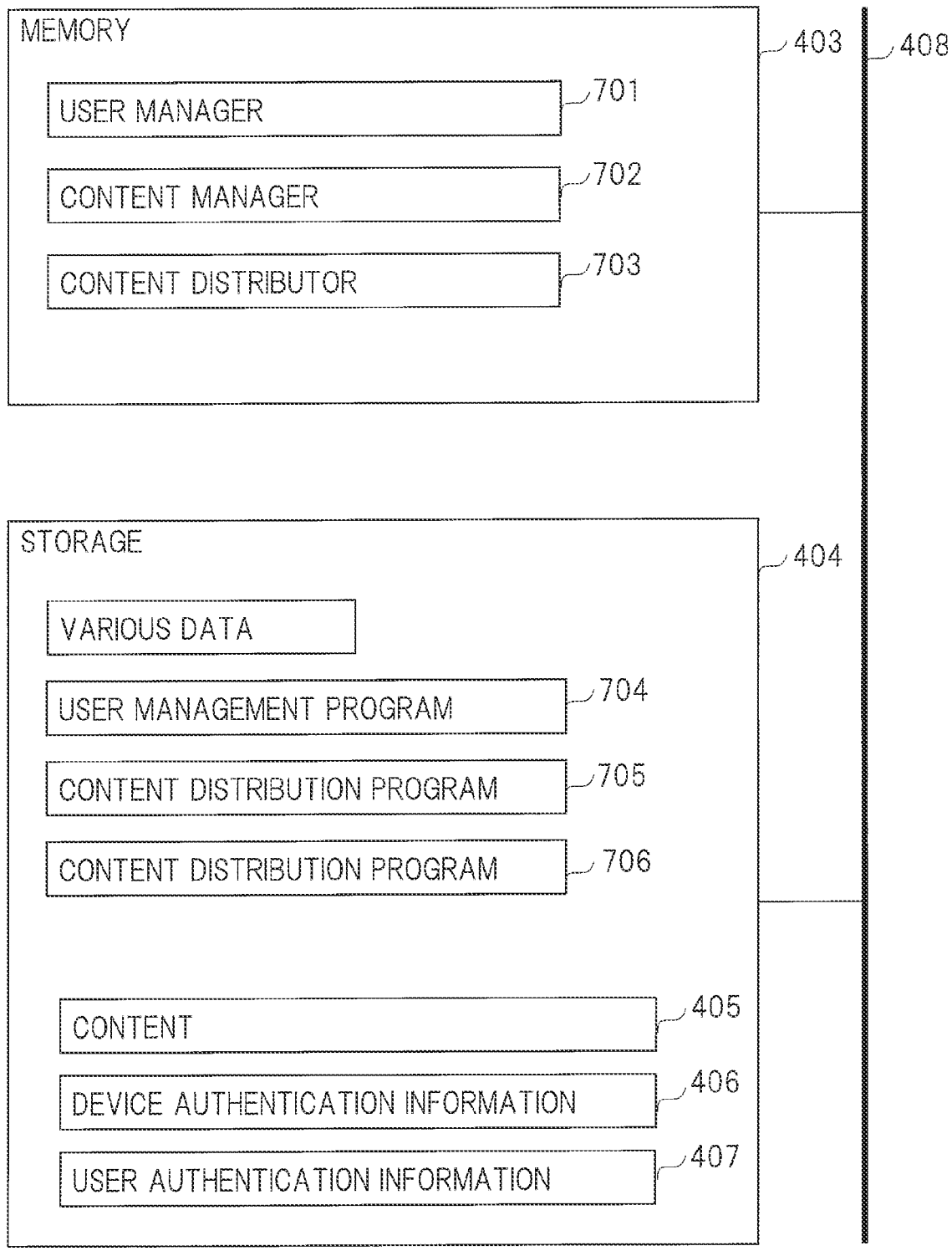
FIG. 7 is an explanatory drawing showing configuration examples of a memory and a storage within the content distribution server of FIG. 4.

FIG. 7 is an explanatory drawing showing configuration examples of the memory 403 and the storage 404 within the content distribution server 106 of FIG. 4.

As shown in FIG. 7, the storage 404 stores a user management program 704, a content management program 705 and a content distribution program 706.

These programs are applied to the memory 403 by the controller 402, and the controller 402 executes the programs to achieve functions of the user manager 701, a content manager 702 and a content distributor 703.

The user management program 704, the content management program 705 and the content distribution program 706 can be stored in the storage 404 or the like in advance. In the description below, each of the various functions achieved by the controller 402 according to these programs will be described as being achieved mainly by each function unit in the memory 403 for the sake of clarity.

The user manager 701 manages the user authentication information for authenticating each user, the device authentication information for authenticating the device in the possession of the user, and the like. The user authentication information and the device authentication information are respectively stored in the user authentication information 407 and the device authentication information 406 of the storage 404.

The user manager 701 obtains the device authentication information of the device used by the user and the user authentication information of the username and password entered by the user of the wireless terminal 102 or television receiver 101 utilizing the input unit 213 or the input unit 311 via the communication I/F 401 and external network 105.

Further, the user manager 701 compares the user authentication information stored in advance to confirm whether or not the user is an authorized and registered user and whether or not the number of devices of the same user is maintained within the number of devices permitted by the service provider. The user manager 701 has a function for returning error information if both pieces of user authentication information do not match or the number of devices exceeds the range permitted.

The content manager 702 manages the content or application data and content information or application information constituted by the information attached to the content or application data.

The content information of the content such as a moving image records a content ID which is a management number for uniquely identifying the content, a content format, content description information, content data, a target apparatus suitable for the size or display of the content, a fee for the content distribution service or for playing back and viewing the distributed content, a viewing period and the like. The content description information includes a genre title, cast, plot and the like.

In addition, the application information records an application ID which is a management number for uniquely identifying the application, application description information, a target of an apparatus suitable for a size or display of the application, and a fee charged by downloading the application.

Note that the various pieces of information may be recorded by utilizing a recording medium such as a hard disk and be read into the memory managed by the content manager 702. In addition, the content or application data and data explaining the content or application data may be separately managed as meta data or the like.

In order to protect the user from a malicious third party accessed via a communication path such as the internet, it may be configured such that key information for decrypting and playing back the content encrypted by an RSA cryptography or the like is managed. Note that the various pieces of information may be recorded by utilizing a recording medium such as a hard disk, and read into the memory managed by the content manager 702.

Based on a distribution request from a device such as the wireless terminal 102 or 103 or the television receiver 101 via the communication I/F 401 or external network 105, the content distributor 703 can control distribution of the content such as moving images accumulated in the content 405 of the storage 404 according to display performance of the connection device.

The content 405 includes a plurality of the same content in various resolutions and distributes the content according to the display performance based on the device authentication information at a time of distribution. It may be configured such that only high definition (HD) content is accumulated and is accordingly down-converted to be distributed according to the display performance at the time of distribution.

<Data Format Example>

FIGS. 8(a) and 8(b) are data tables showing an example of the user profile information managed by the user profile generator 609 of FIG. 6.

FIG. 8(a) shows the user profile information managed by the user profile generator 609 of the wireless terminal 102. FIG. 8(b) shows the user profile information managed by the user profile generator 609 of the wireless terminal 103.

As shown in FIGS. 8(a) and 8(b), the user profile information is constituted by a user ID 801 which is a management number, a password 802, a unique username 803, a setting parameter 804, an application type 805, downloaded content 806, device type information 807 and the like.

The user ID 801 and the password 802 are each the authentication information for receiving content distribution from the content distribution server 106. In addition, in the present embodiment, the user profile information includes the authentication information; however, the user profile information may not include the authentication information for security reasons and the like.

The username 803 is unique information of each user and is used when logging in to the content distribution server 106. The examples shown in FIGS. 8(a) and 8(b) indicate that the username associated with a wireless terminal A which is the wireless terminal 102 is "T. Matsu" and the username associated with a wireless terminal B which is the wireless terminal 103 is "M. Kage".

The setting parameter 804 includes information such as a menu set according to the user's preference. The application type 805 includes a title of the application installed before purchase, obtained by download purchasing or the like.

The downloaded content 806 includes the title and the like for identifying the content obtained by download purchasing or the like. The device type information 807 is information indicating a type of device such as a mobile terminal or a tablet and an application such as an OS in use and compatibile during content playback, and a user agent may also be used. The user agent is software or hardware utilized when the user uses data based on a given protocol.

In addition, the present embodiment will be described under the presumption that user authentication uses the user ID and the password; however, user authentication may use common biometric information such as finger veins, a fingerprint, a voice, a face image or an iris. In this case, item names of the user authentication information change as appropriate.

FIGS. 9(a) and 9(b) are data tables showing item examples of the user authentication information 407 and device authentication information 406 of FIG. 4.

FIG. 9(a) is the data table of the user authentication information 407 managed by the user manager 701 of the content distribution server 106. FIG. 9(b) is the data table of the device authentication information 406 managed by the user manager 701 of the content distribution server 106.

In FIG. 9(a), the user ID 801 which is the management number, the password 802, the unique username 803, name, street address, contact and the like are stored in the user authentication information 407 managed by the user manager 701.

The present embodiment will be described under the presumption that user authentication uses a password; however, user authentication may use common biometric information such as finger veins, a fingerprint, a voice, a face image or an iris. In this case, item names of the user authentication information change as appropriate. The user authentication information is used as login information when logging in to the content distribution service from a device such as the television receiver 101 or the wireless terminal 102.

Next, in FIG. 9(b), the device authentication information 406 managed by the user manager 701 of the content distribution server 106 includes the user ID 801 which is the management number, the password 802, a device ID 901 indicating the device used by the user, a model name and the like. The device authentication information 406 is information for uniquely identifying a device and is registered to the content distribution service provider in advance by the user.

In addition, FIG. 9(b) shows that the user whose user ID 801 is "00000101" possesses two devices indicated by the device ID 901, and (AB-C1000) indicating the television receiver 101 and (DF-2000F) indicating the wireless terminal 102 are registered as devices.

Similarly, regarding the user whose user ID 801 is "00000102", (GH-10000) indicating the wireless terminal 103 is registered as the device. The password 802 used may differ from the password of the user authentication information.

Information such as a MAC (Media Access Control) address unique to the device can be used for the device ID 901. In addition, the type of content available for playback and resource information such as video processing capability can be associated with the device ID in advance and be accumulated as a database.

<Example of Actions in Network Terminal System>

Next, actions in the network terminal system according to the present embodiment will be described with reference to FIGS. 10 to 21. Here, actions for distributing content from the content distribution server 106 to the television receiver 101 and displaying the content on the television receiver 101 by using the wireless terminals 102 and 103 as operation terminals will be described.

Figure 10:
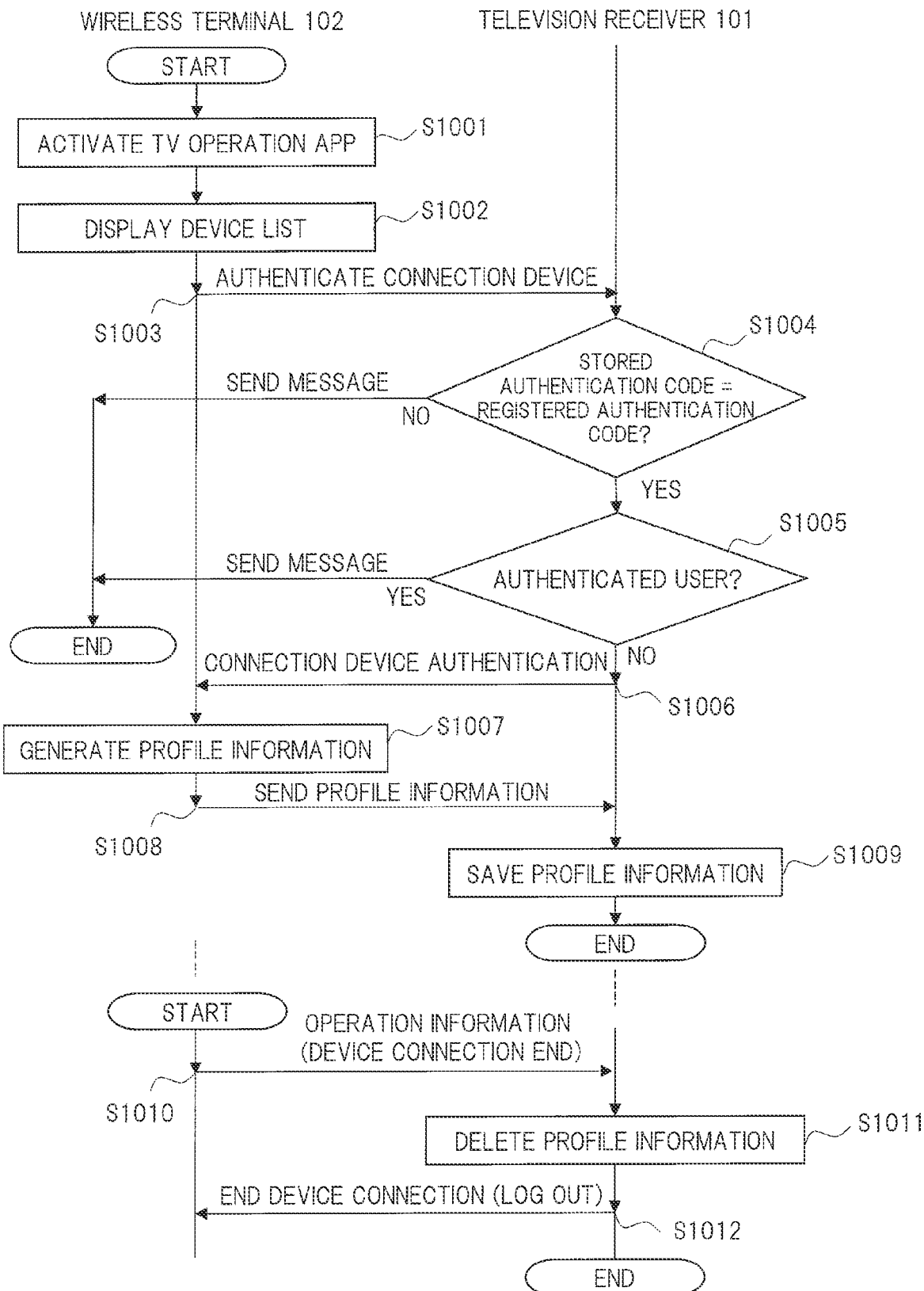
FIG. 10 is a flowchart showing an example of processes performed by the wireless terminal and television receiver within the network terminal system of FIG. 1.
Figure 11:
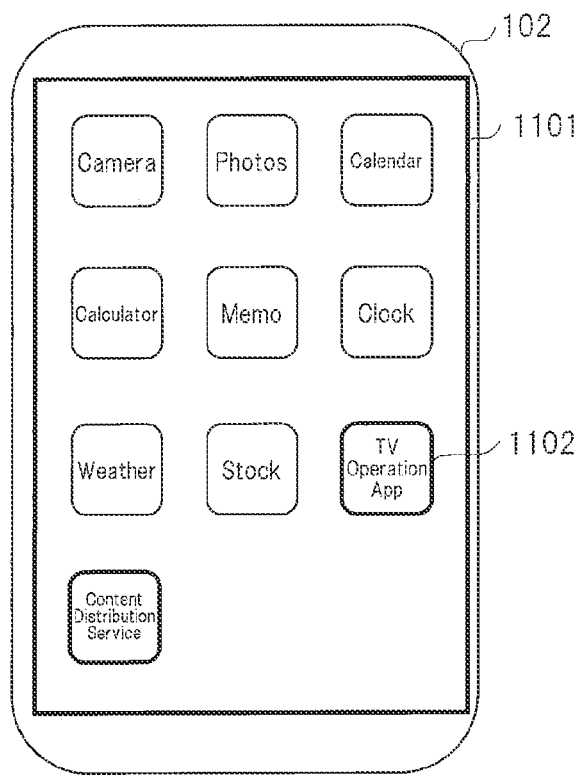
FIGS. 11(a)-11(b) are explanatory drawings showing a display example of the wireless terminal within the network terminal system of FIG. 1.
Figure 11:
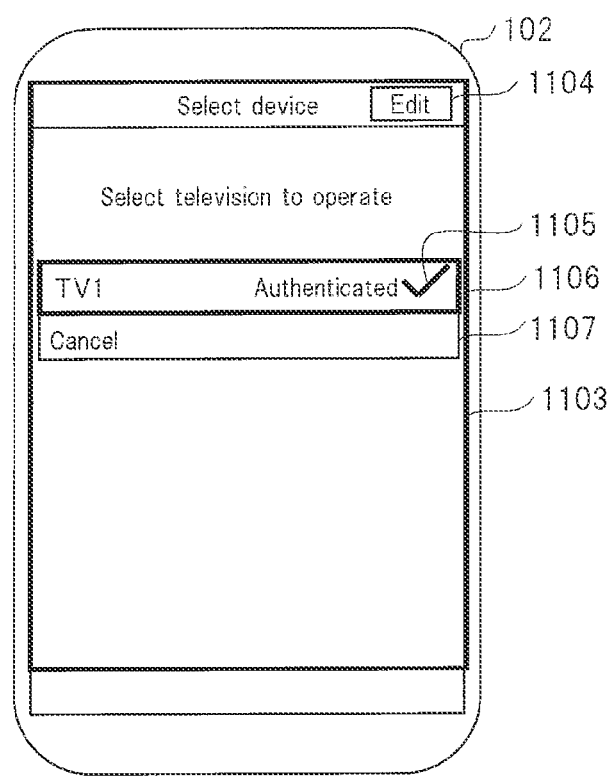

FIG. 10 is a flowchart showing an example of processes performed by the wireless terminal 102 and television receiver 101 within the network terminal system of FIG. 1. FIG. 10 shows an example in which, when the wireless terminal 102 is connected to the television receiver 101, the wireless terminal 102 and the television receiver 101 exchange information.

In addition, FIGS. 11(a) and 11(b) are explanatory drawings showing a display example of the wireless terminal 102 of the network terminal system of FIG. 1. FIG. 11(a) shows a display example of a menu screen of the wireless terminal 102. FIG. 11(b) shows a display example of a connection device list display screen of the wireless terminal 102.

First, in FIG. 10, when a tap operation is performed on a TV operation App 1102 displayed on a menu screen 1101 of FIG. 11(a), the various application unit 608 of the wireless terminal 102 receives an instruction for activating the application by the input unit 311 and activates the "TV operation App" application (step S1001).

When the "TV operation App" application is activated, the device list 1103 as shown in FIG. 11(b) is displayed on the display 308 of the wireless terminal 102 (step S1002). In a case where devices connected to the network are found, the devices are displayed in the device list 1103 of FIG. 11(b) regardless of authentication, and these devices are stored in the storage 304 together with the authenticated or non-authenticated information.

FIG. 11(b) shows the device list 1103 displaying, for example, "TV1 authenticated" as an indication 1106 and "Cancel" as an indication 1107, and shows that "TV1" is an authenticated device. "Cancel" of the indication 1107 is an item to be selected in a case where the wireless terminal is used alone without preforming authentication of the device. Here, TV1 indicates the television receiver 101.

As shown in FIG. 11(b), the wireless terminal 102 displays "authenticated" for the device already authenticated by the connection device authentication unit 501, that is, a device among the devices connected to the network having a device ID registered to the device authentication information. The wireless terminal 102 displays "not authenticated" for non-authenticated devices, that is, devices whose device IDs are not registered.

FIG. 11(b) shows a display example in a case where the "TV1 indication" is already authenticated in the wireless terminal 102. In addition, a check mark 1105 is displayed on the selected device, and the user can discriminate between devices selected and not selected. Further, an edit button 1104 is a button for deleting the connection device or adding a connection device.

In order to receive authentication from the television receiver 101 when the device to be connected is selected by the input unit 311 of FIG. 11(b), the connection device authentication unit 601 of the wireless terminal 102 sends the connection device authentication information registered in the various data in advance to the connection device authentication unit 501 of the television receiver 101 via the communication I/F 309 and communication I/F 212 (step S1003). Here, a case where the television receiver 101 is selected in a process of step S1003 will be described by way of example.

When the connection device authentication unit 501 of the television receiver 101 receives the connection device authentication information from the wireless terminal 102, the connection device authentication unit 501 compares the authentication information stored in the various data and the authentication information sent from the wireless terminal 102. If these pieces of authentication information match (step S1004: YES), presence of an authenticated user is confirmed (step S1005).

If no authenticated user is present (step S1005: NO), connection of the wireless terminal 102 is permitted (step S1006). When authentication of the wireless terminal 102 is completed, the account manager 509 sets the wireless terminal 102 as an authenticated user account.

If the pieces of the authentication information do not match (step S1004: NO), an error message is sent to the user of the wireless terminal 102. If the pieces of authentication information do not match, a message prompting re-entry of the information may be displayed.

In addition, if an authenticated user (step S1005: YES) is present, a message is sent indicating that the currently authenticated wireless terminal is preferentially used and the wireless terminal 102 is stopped from being used.

Here, if there is no response because the television receiver 101 is not powered ON or because of another reason, a power-ON command for activating power of the television receiver 101 can be added in a process of step S1003, so that device authentication can be performed again. This process can narrow down the devices which use the television receiver 101 by a remote operation and enhance security. In addition, in a case where the connection is established with the same device as the previous one, step S1002 can be omitted by performing automatic authentication.

Subsequently, when the wireless terminal 102 is notified of a connection permission in a process of step S1006, the user profile generator 609 of the wireless terminal 102 generates the profile information of the user of the wireless terminal 102 (step S1007) and sends the profile information to the television receiver 101 (step S1008).

The television receiver 101 associates the received profile information and the user account authenticated in a process of step S1004 and stores the user profile information of the wireless terminal 102 in the various data of the storage 216 (step S1009).

Next, a case where, after the television receiver 101 is operated by the wireless terminal 102, device connection between the wireless terminal 102 and the television receiver 101 is completed will be described.

When a tap operation is performed on an "end" button (not shown) displayed on the display 308 of the wireless terminal 102, operation information indicating a device connection end is sent to the television receiver 101 (step S1010). The television receiver 101 deletes the user profile information obtained from the wireless terminal 102 (step S1011), sends the device connection end to the wireless terminal 102 and logs out (step S1012).

Here, as described with reference to FIGS. 8(a) and 8(b), the user profile information includes information such as the authentication information including the user ID 801 and the password 802, information of the setting parameter 804 such as the menu, the application type 805 including the preferred applications, the downloaded content 806 including the preferred content and the device type information 807.

Further, in a case where these pieces of information are carried over to be used in the television receiver 101, the pieces of information correspond to the device authentication information of the wireless terminal 102 and are independently stored such that the same setting state, device state and the like as in the wireless terminal 102 can be used.

In addition, in a case where the profile information stored in a process of step S1009 is changed during the operation of the television receiver 101, the updated data can be stored as the latest data. The updated profile information can also be imported to the wireless terminal 102 before device connection end is performed in a process of step S1010.

Next, actions that occur when the television receiver 101 and the content distribution server 106 exchange the content information and the content list is displayed on the television receiver 101 and actions that occur when the content is displayed will be described with reference to FIG. 12.

Figure 12:
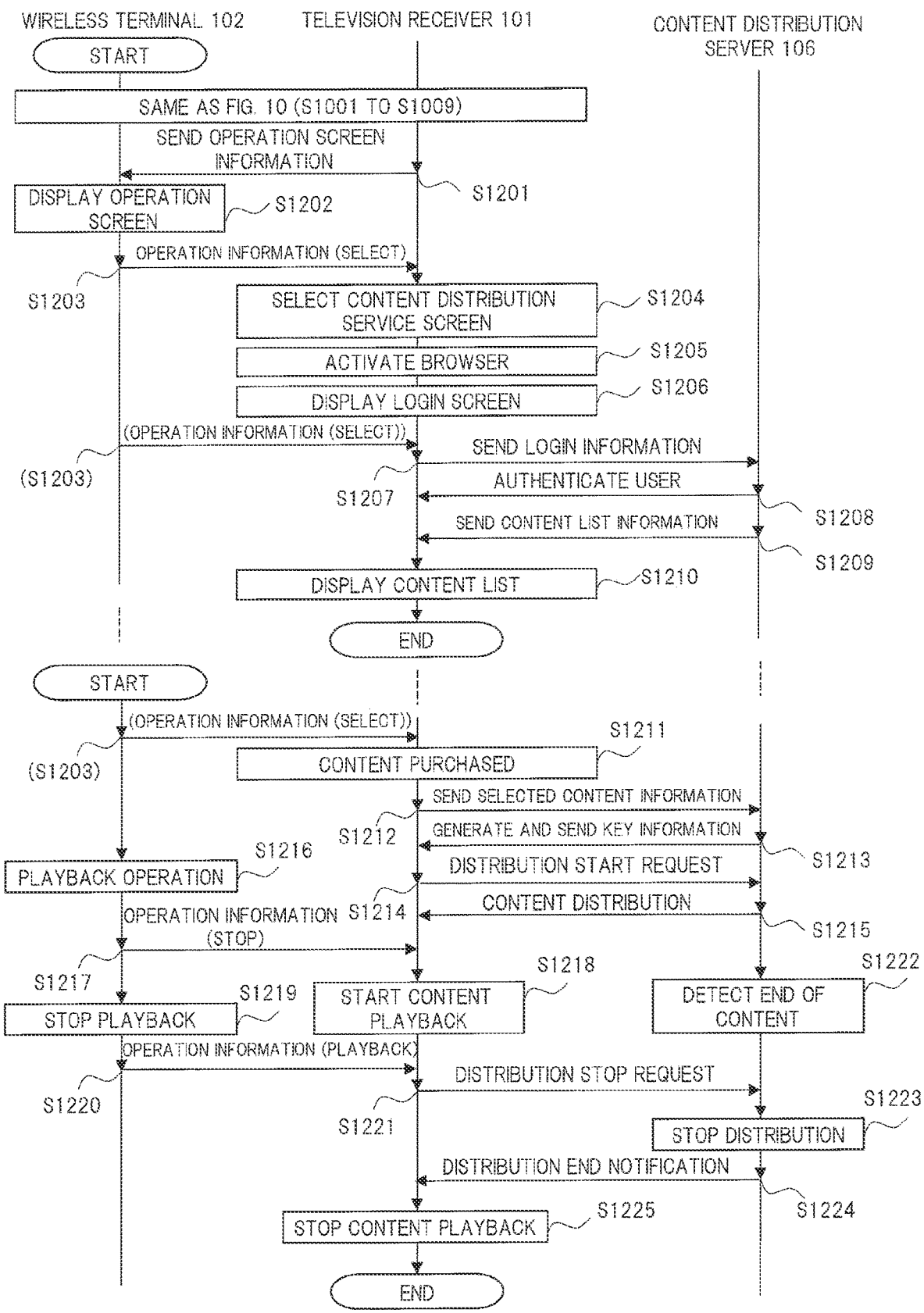
FIG. 12 is a flowchart showing an example of processes performed by the wireless terminal, the television receiver and the content distribution server within the network terminal system of FIG. 1.

FIG. 12 is a flowchart showing an example of processes performed by the wireless terminal 102, the television receiver 101 and the content distribution server 106 within the network terminal system of FIG. 1.

FIG. 12 shows additional processes of step S1201 to step S1210 continued from a sequence (S1001 to S1009) of FIG. 10 of sending and storing the profile information from the wireless terminal 102 to the television receiver 101.

The television receiver 101 sends operation screen information to the wireless terminal 102 for displaying the operation screen on the display 308 of the wireless terminal 102 (step S1201). The wireless terminal 102 displays the operation screen shown in FIGS. 13(a) and 13(b) on the display 308 based on the operation screen information. FIGS. 13(a) and 13(b) show an explanatory drawing showing a display example of the operation screen of the wireless terminal 102 within the network terminal system of FIG. 1.

As shown in FIGS. 13(a) and 13(b), operation buttons 1303 and 1304 corresponding to the connected device are displayed on an operation screen 1301. A connection device symbol 1302 indicates the currently connected device.

In addition, when a right-flick or left-flick operation is performed on the operation screen 1304, the operation screen for the operation buttons can be switched. In FIG. 13(a), the left-flick allows the operation screen to be switched to the operation screen of FIG. 13(b). In addition, a flick operation in the opposite direction allows the operation screen of FIG. 13(b) to return to the operation screen of FIG. 13(a).

FIGS. 13(a) and 13(b) show two operation screens; however, one operation screen or a plurality of operation screens may be provided for each device. In addition, button arrangement on the operation screen can be changed according to the user's preference or can be changed such that the buttons are automatically or manually rearranged in the order of frequent usage. Further, a triangular mark 1305 is a mark for ending the operation screen, and when a tap operation is performed on the triangular mark 1305, an operation screen 3101 is closed and the screen returns to the menu screen shown in FIG. 11(a).

Here, the operation screen information is obtained from the television receiver 101 in a process of step S1201; however, obtaining the operation screen information may be omitted by installing an application program downloaded in advance in the wireless terminal 102.

In FIG. 13(b), when a tap operation is performed on an App menu button 1306 on the operation screen by the input unit 311 of the wireless terminal 102, "operation information (select)" of the App menu button 1306 is sent to the television receiver 101 (step S1203).

Figure 14:
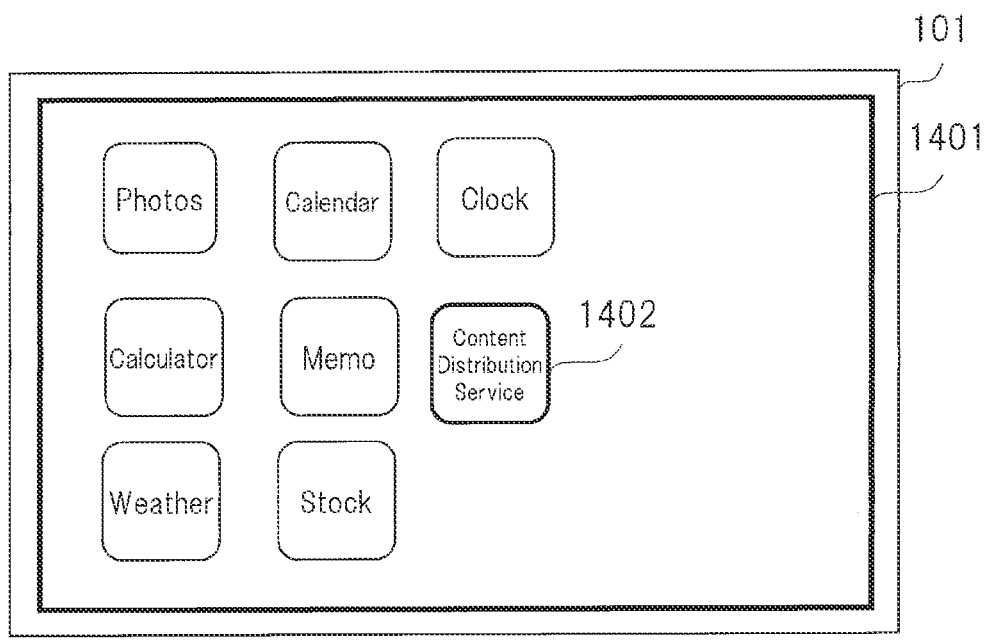
FIG. 14 is an explanatory drawing showing a display example of an App menu screen of the television receiver within the network terminal system of FIG. 1.

When the controller 214 of the television receiver 101 receives the "operation information (select)" of the App menu button 1306, the controller 214 refers to the user profile information stored in the process of step S1009 of FIG. 10 and displays an App menu screen 1401 on the display 210 as shown in FIG. 14 based on user settings of the wireless terminal 102.

FIG. 14 is an explanatory drawing showing a display example of an App menu screen of the television receiver 101 within the network terminal system of FIG. 1.

Here, although not shown, there may be a case where an application indicated by an object of the application activation icon based on the user profile information stored in the process of step S1009 of FIG. 10 is not present in the App menu of the television receiver 101.

In this case, the content/application synchronization processor 510 can search for the matching application and download the application from the content distribution server 106 to synchronize the applications of the wireless terminal 102 and the television receiver 101.

Next, when a tap operation is performed on a cursor/OK button 1307 on the operation screen 1301 of the wireless terminal 102, the "operation information (select)" is sent as in a process of step S1203 and the television receiver 101 selects an icon 1402 of the "content distribution service" in, for example, the App menu screen 1401 based on the received "operation information (select)" (step S1204).

The various application unit 508 of the television receiver 101 receives an instruction for activating the browser and activates the browser engine 502 (step S1205). The browser engine 502 refers to the user profile information stored in the process of step S1009 of FIG. 10 and accesses the content distribution server 106 of a content viewing portal set in advance in the wireless terminal 102.

Here, it may be configured such that an address of the content viewing portal is selected from an address list set in advance in "preference settings" or the like within a setting parameter of the user profile information or may be configured such that the last accessed address is stored and is later accessed.

Further, the browser engine 502 sends a request message from the external network 105 to the content distribution server 106 via the communication I/F 212 and wireless router 104, requesting resources such as web content that complies with HTTP (HyperText Transfer Protocol).

The content distribution server 106 creates and returns a response message corresponding to the received request message. The returned response message is entered into the browser engine 502 via the external network 105.

An HTML document is embedded in the response message. The HTML parser 503, the database generator 504, the renderer 505 and the image processor 506 of the browser engine 502 work together to generate a browser display screen based on the HTML document, so that the login screen of the content viewing portal is displayed on the display 210 (step S1206).

In the login screen displayed by the above-described processes, the controller 214 notifies login information including the entered username and password to the browser engine 502 by the same operation information as in the process of step S1203 and sends a received character string to the content distribution server 106 as a request message (step S1207).

The content distribution server 106 refers to the user authentication information stored in the user authentication information 407 by the user manager 701 and authenticates the user if the user is an authorized and registered user (step S1206).

Here, in FIG. 12, the login screen is displayed in a process of step S1206 in a case where the user authentication information is not included in the user profile information for security reasons and the like. However, it can be configured such that an automatic authentication processing is performed by referring to the user ID and the password of the user profile information stored in the process of step S1009 of FIG. 10. In this case, the process of step S1206 can be omitted.

Subsequently, when authentication in a process of step S1208 is completed, the content manager 702 of the content distribution server 106 returns the content list information to the browser engine 502 as a response message (step S1209).

The content list information sent at this time is information for displaying a list of the content managed by the content manager 702 and includes information for identifying the managed content.

Figure 15:
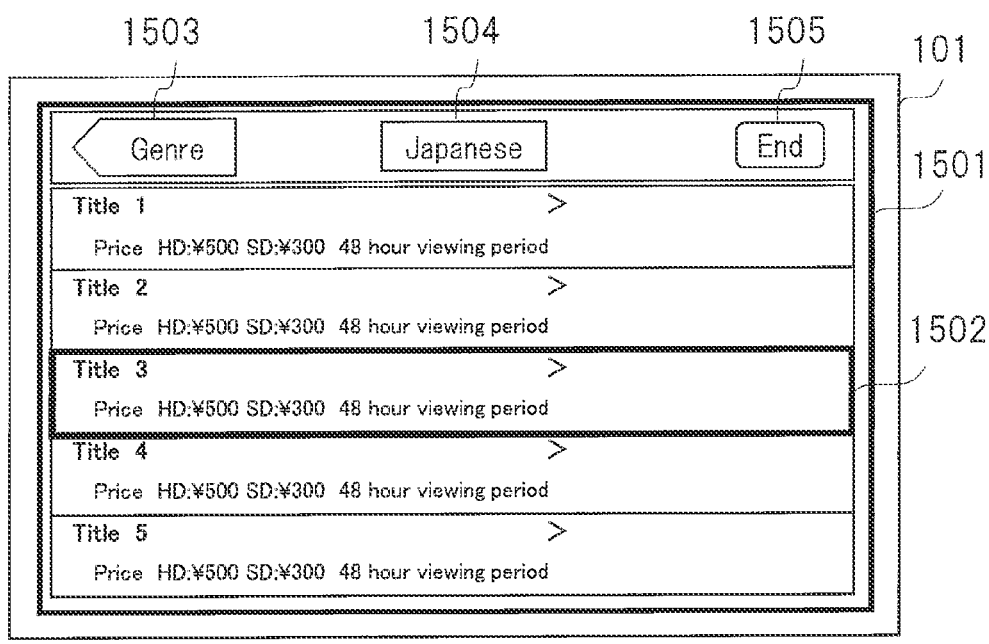
FIG. 15 is an explanatory drawing showing a display example of a content list display screen of the television receiver within the network terminal system of FIG. 1.

When the browser engine 502 receives the content list information from the content manager 702, the browser engine 502 refers to the content ID for uniquely identifying the content, content description information (genre title, cast, plot and the like), a fee for playing back and viewing the content, a viewing period and the like included in the content list information and displays the content list display screen on the display 210 as shown in FIG. 15 (step S1210). Note that the content description information includes a genre title, cast, plot and the like.

FIG. 15 is an explanatory drawing showing a display example of the content list display screen of the television receiver 101 within the network terminal system of FIG. 1.

In FIG. 15, a content title name, a viewing fee, a viewing period and the like are displayed on a content title display 1501. In addition, a back button 1503 is a button for returning to a higher level of information by a tap operation and allows the screen to return to the previous genre level.

FIG. 15 shows that a button 1504 of a Japanese movie in a movie genre is selected. An end button 1505 is an operation unit for instructing end of content viewing by a tap operation.

Figure 16:
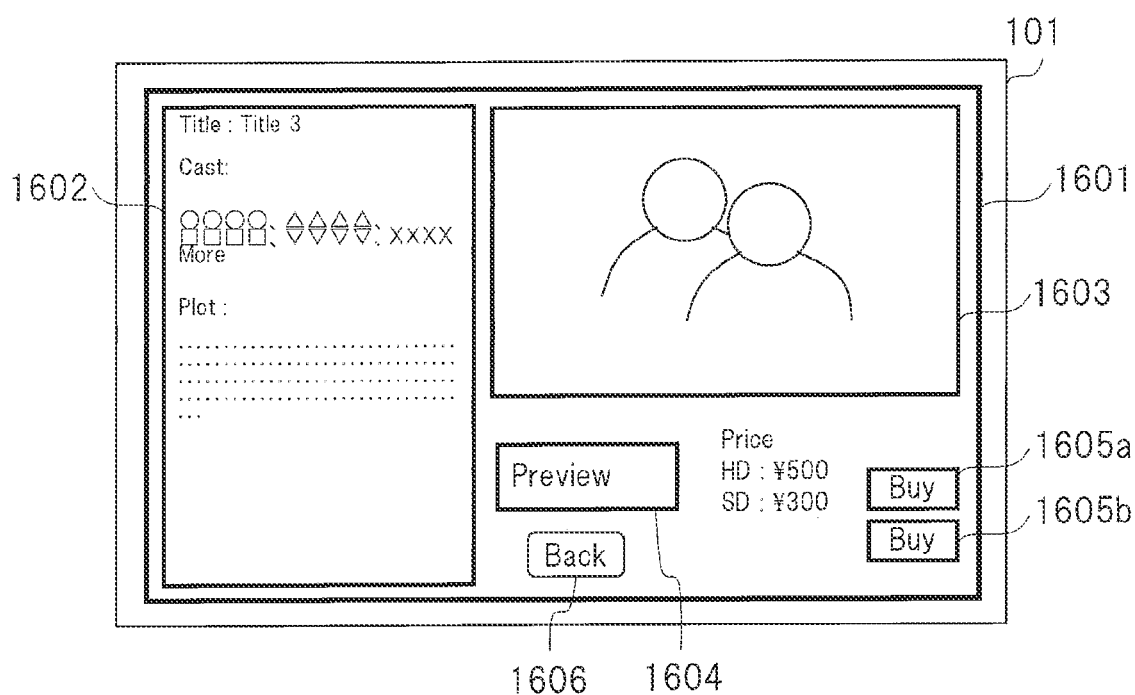
FIG. 16 is an explanatory drawing showing a display example of a content detail display screen of the television receiver within the network terminal system of FIG. 1.

In the screen shown in FIG. 15, when a title 1502 of the content to be viewed is selected in the content list display screen by the operation information of the wireless terminal 102, a content detail display screen 1601 shown in FIG. 16 is displayed.

FIG. 16 is an explanatory drawing showing a display example of the content detail display screen of the television receiver 101 within the network terminal system of FIG. 1.

In FIG. 16, the title, cast and plot details are displayed in content details 1602. A preview button 1604 is an operation unit for instructing display of a portion of the content such that the content can be partially confirmed before purchase. An index screen 1603 is a still image showing one scene of the content and can display moving images of a portion of the content by selecting the preview button 1604.

Purchase buttons 1605a and 1605b are operation units for selecting and purchasing the content. In FIG. 16, the purchase buttons 1605a and 1605b respectively associated with an HD (High Definition) image quality content and an SD (Standard Definition) image quality content are provided for selecting and purchasing the HD image quality content or the SD image quality content. A back button 1606 is an operation unit for returning to the content list display screen of FIG. 15, that is, for instructing switching of the display to the content list display screen.

In the content detail display screen shown in FIG. 16, when one of the purchase buttons 1605a and 1605b is selected by the operation information of the wireless terminal 102 (step S1211), the controller 214 sends content selection information to the content distribution server 106 (step S1212).

The content selection information includes information for identifying desired content and information for identifying whether the desired content is in HD image quality or in SD image quality as necessary.

The content distribution server 106 generates the key information for decrypting the content identified based on the content selection information and sends the key information to the television receiver 101 (step S1213).

The key information is constituted by the decryption key for decrypting the information of the encrypted content as well as the content ID for each item of content, the expiration date or the number of times the content can be played back, and the like. Note that the step (step S1213) of sending the key information is necessary to encrypt the content and may be omitted if the content does not need to be encrypted.

When the television receiver 101 receives the key information from the content distribution server 106 and completes preparation for receiving the content, the television receiver 101 sends a content distribution start request (step S1214). The content distributor 703 of the content distribution server 106 having received the distribution start request from the television receiver 101 starts the content distribution to the television receiver 101 (step S1215).

When a tap operation is performed on "play" on an operation screen 1213 screen shown in FIG. 13(b) by the user's operation via the input unit 311 (step S1216), the wireless terminal 102 sends operation information (playback) to the television receiver 101 (step S1217).

In the television receiver 101 having received the operation information (playback), the content player 507 performs playback processing of the content. At this time, if there is a decryption key, the decryption key is utilized to decrypt information of encrypted content and start playback of the content (step S1218).

In a case where a stop operation button on the operation screen 1304 shown in FIG. 13(b) is selected (step S1219), the wireless terminal 102 sends operation information (stop) to the television receiver 101 (step S1220), and the television receiver 101 sends a distribution stop request to the content distribution server 106 (step S1221).

In a case where the content distribution server 106 receives the distribution stop request from the television receiver 101 or the content distribution server 106 detects an end of the content (step S1222), the content distribution server 106 stops distributing the content (step S1223) and sends a content distribution end notification to the television receiver 101 (step S1224).

When the television receiver 101 receives the content distribution end notification, the television receiver 101 stops playing back the content (step S1225). Here, it can be configured such that the television receiver 101 returns to a state before start of content playback when the television receiver 101 stops playback in a process of step S1219.

In addition, in a case where playback is stopped by the process of step S1219, information of the playback stop position of the content is stored in the user profile information of the storage 216 of the wireless terminal 102 as resume information.

Further, in a case where playback operation is performed again via the wireless terminal 102 and playback of the same content is resumed by the same user, the content player 507 of the television receiver 101 can obtain data of the playback stop position from the resume information and resume playback by using the playback stop position as the playback start position.

In addition, the information of the playback stop position of the content can be held by the content distribution server 106. In this case, the content distribution server 106 sends the information of the playback stop position of the content together with the information of the content in the process of step S1215.

In this manner, distribution can be started in the television receiver 101 from the playback start position calculated based on the information of the playback stop position obtained together with the information of the content from the content distribution server 106.

Note that a flow of actions in a case where distribution of the content is received from the content distribution server 106 to playback the content has been described; however, it may be configured such that all items of content data are obtained and accumulated at the timing of the process of step S1215 of FIG. 12, and the content is played back for viewing after accumulation is completed. In this case, the process of step S1222 and the process of step S1223 of FIG. 12 are unnecessary.

In addition, in the process of the step S1213 of sending the key information, the television receiver 101 can store the key information received from the content distribution server 106 in the storage 216. Alternatively, the key information can be discarded each time and be obtained from the content distribution server at the timing of the process of step S1218 every time the content is played back.

In addition, in a case where the content downloaded from the content distribution server 106 and played back on the wireless terminal 102 is stopped part way through the content, and the user wishes to view the rest of the content on the television receiver 101, the downloaded content can be synchronized between the wireless terminal 102 and the television receiver 101 by the content/application synchronization processor 510 of the television receiver 101 based on the user profile information.

Here, in a case where the wireless terminal 102 is used alone, the content player 607 performs the playback processing of the content as in the content player 507 of the television receiver 101.

Next, actions that occur when the wireless terminal 102 and the wireless terminal 103 simultaneously access the television receiver 101, the content information is exchanged between the television receiver 101 and the content distribution server 106, and the content list is displayed on the television receiver 101 will be described with reference to FIG. 17.

Figure 17:
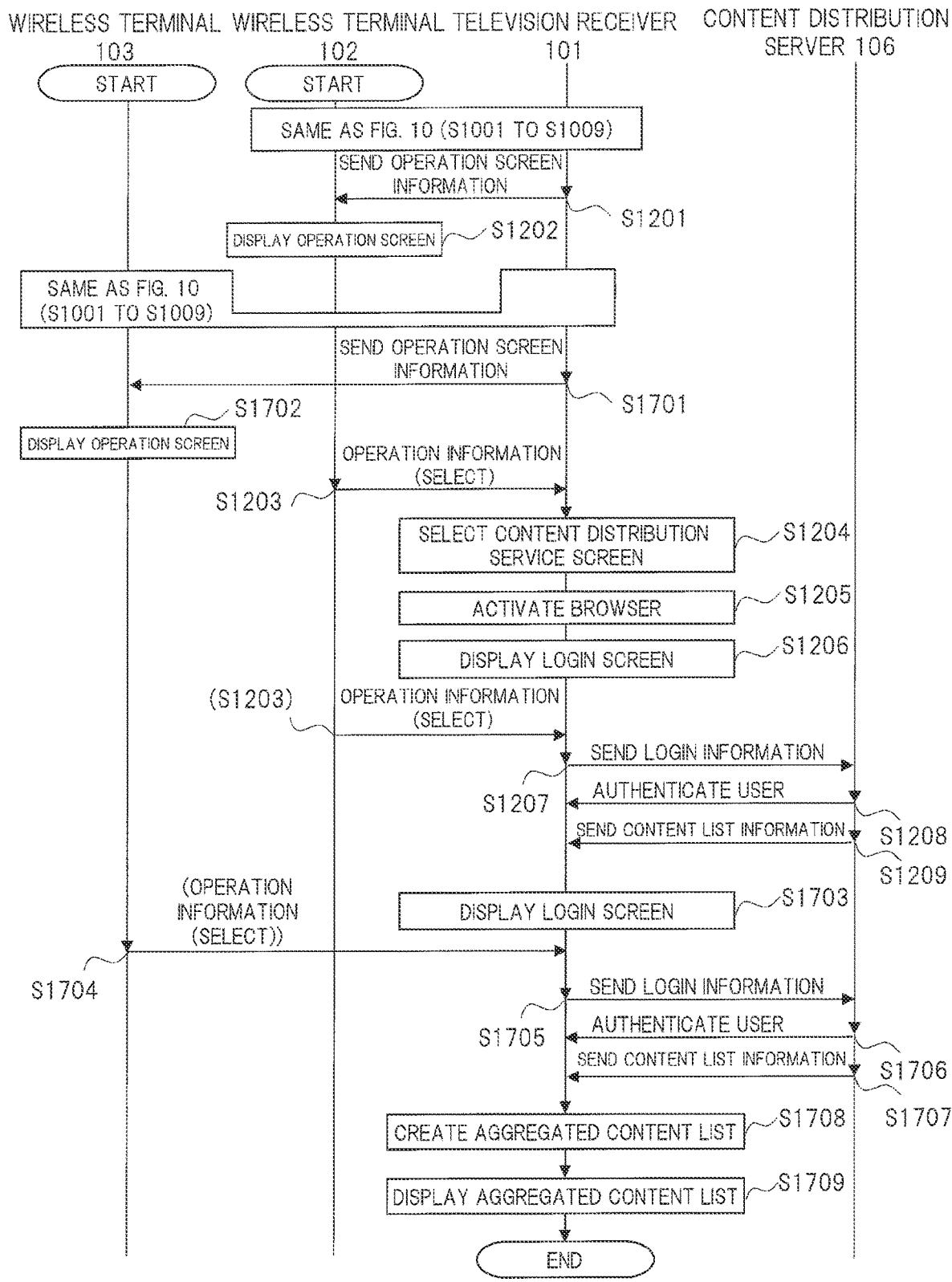
FIG. 17 is a flowchart showing an example of processes performed by the wireless terminals, the television receiver and the content distribution server within the network terminal system of FIG. 1.

FIG. 17 is a flowchart showing an example of processes performed by the wireless terminals 102 and 103, the television receiver 101 and the content distribution server 106 within the network terminal system of FIG. 1.

FIG. 17 shows an action sequence of the wireless terminal 103 newly added to the action sequence of the wireless terminal 102, the television receiver 101 and the content distribution server 106 shown in FIG. 12.

First, after the processes of steps S1001 to S1009 in the sequence of FIG. 10 of sending and storing the profile information from the wireless terminal 102 to the television receiver 101, the television receiver 101 sends the operation screen information for displaying the operation screen on the display 308 of the wireless terminal 102 to the wireless terminal 102 in the process of step S1201.

Figure 13:
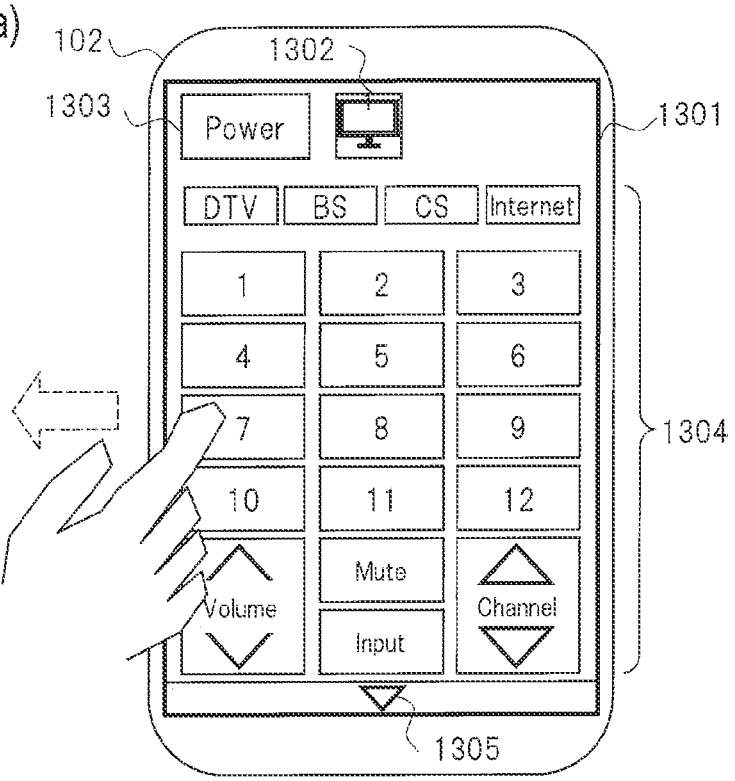
FIGS. 13(a)-13(b) are explanatory drawings showing a display example of the operation screen of the wireless terminal within the network terminal system of FIG. 1.
Figure 13:
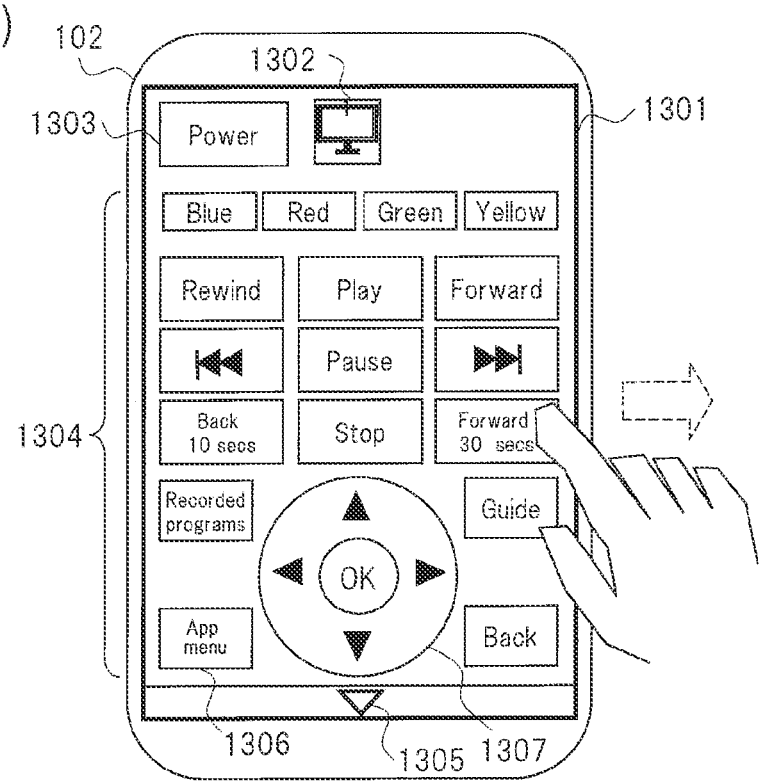

The wireless terminal 102 displays the above-described operation screen on the display 308 as shown in FIG. 13 based on the operation screen information in a process of step S1202. FIG. 13 shows a display example of the operation screen of the wireless terminal 102. Details of FIG. 13 has been described above, and thus, redundant descriptions will be omitted.

Likewise, after the processes of steps S1001 to S1009 in the sequence of FIG. 10 of sending and storing the profile information from the wireless terminal 103 to the television receiver 101, the television receiver 101 sends the operation screen information for displaying the operation screen on the display 308 of the wireless terminal 103 to the wireless terminal 103 in a process of step S1701. The wireless terminal 103 displays the operation screen shown in FIG. 13 on the display 308 based on the operation screen information in the process of step S1702.

According to the above-described action sequence, the television receiver 101 can identify that the wireless terminals 102 and 103 are capable of simultaneously accessing the television receiver 101.

Here, it is assumed that a tap operation is performed on the cursor/OK button 1307 on the operation screen 1301 of any one of the wireless terminals capable of simultaneously accessing the television receiver 101. FIG. 17 will be described below under the assumption that a tap operation is performed on the cursor/OK button 1307 on the operation screen 1301 of the wireless terminal 102 in the process of step S1203.

When a tap operation is performed on the cursor/OK button 1307 on the operation screen 1301 of the wireless terminal 102, "operation information (select)" is sent as in the process of step S1203, and the television receiver 101 displays a login screen of the content viewing portal on the display 210 according to the processes of steps S1204 to S1206 in the action sequence shown in FIG. 12.

In the login screen displayed by the above-described processes, the controller 214 notifies the login information including the username and password entered from the wireless terminal 102 to the browser engine 502 by the same operation information as in the process of step S1203 and sends a received character string to the content distribution server 106 as a request message (step S1207).

The content distribution server 106 refers to the user authentication information information stored in the user authentication information 407 by the user manager 701 and authenticates the user if the user is the authorized and registered user (step S1208).

When authentication in the process of step S1208 is completed, the content manager 702 of the content distribution server 106 returns the content list information available for viewing by the user of the wireless terminal 102 to the browser engine 502 as a response message (step S1209).

Subsequently, the television receiver 101 displays the same login screen as in step S1206 targeting the wireless terminal 103 (step S1703). In the login screen displayed by the same processes as above, the controller 214 notifies the login information including the username and password entered from the wireless terminal 103 to the browser engine 502 by the same operation information (step S1704) as in the process of step S1203 and sends a received character string to the content distribution server 106 as a request message (step S1705).

The content distribution server 106 refers to the user authentication information stored in the user authentication information 407 by the user manager 701, and authenticates the user if the user is the authorized and registered user (step S1706).

When authentication in step S1706 is completed, the content manager 702 of the content distribution server 106 returns the content list information available for viewing by the user of the wireless terminal 103 to the browser engine 502 as a response message (step S1707).

The television receiver 101 repeats the action sequence in the processes of steps S1703 to S1707 targeting all wireless terminals that are capable of simultaneous accessing the television receiver 101 and are not yet logged in.

Note that the television receiver 101 may temporarily store the login information including the username and password entered from the wireless terminals 102 or 103 in the memory 215 and collect and successively send all pieces of login information stored in the memory 215 to the content distribution server 106 after all pieces of information are entered from the wireless terminals 102 and 103.

Figure 18:
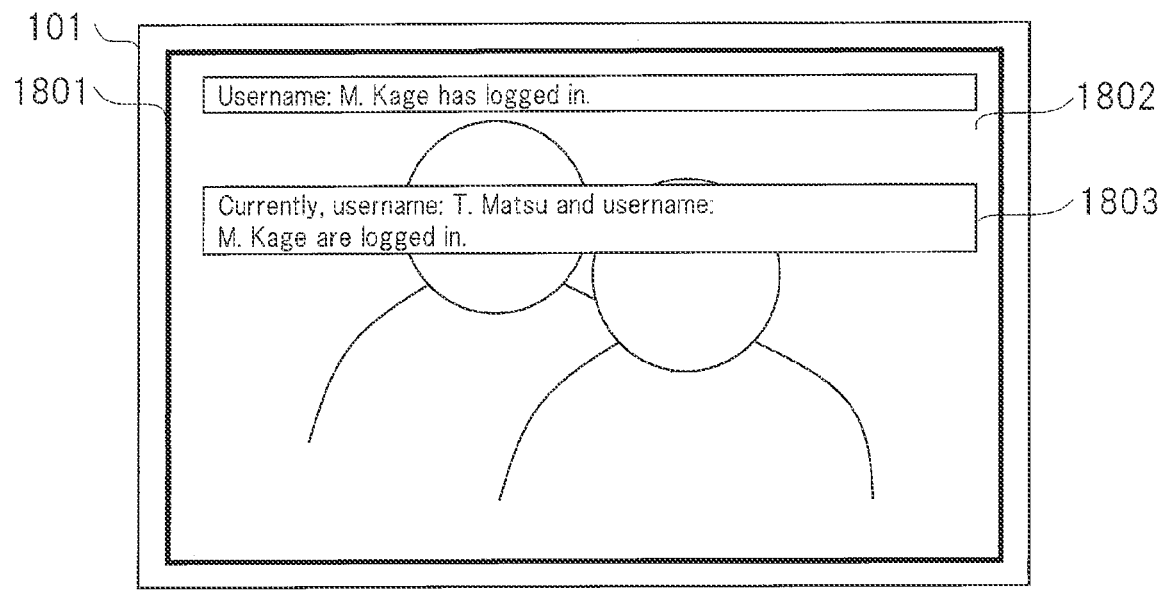
FIG. 18 is an explanatory drawing showing a display example of a login completed notification screen displayed on the television receiver.

FIG. 18 is an explanatory drawing showing a display example of a login completed notification screen displayed on the television receiver.

Every time the user authentication is completed by the content distribution server 106, that is, after the process of step S1208 and a process of step S1706, the television receiver 101 may display a login completed notification screen 1801 shown in FIG. 18.

At this time, the notification message to be displayed may include a message 1802 notifying a newly logged-in username and a message 1803 notifying all logged-in usernames.

Subsequently, the controller 214 of the television receiver 101 creates an aggregated content list (step S1708) and displays the aggregated content list display screen on the display 210 (step S1709). The aggregated content list is constituted by the content list information which is sent in a process of step S1209 and is available for viewing by the user of the wireless terminal 102 and the content list information which is sent in a process of step S1407 and is available for viewing by the user of the wireless terminal 103.

Figure 19:
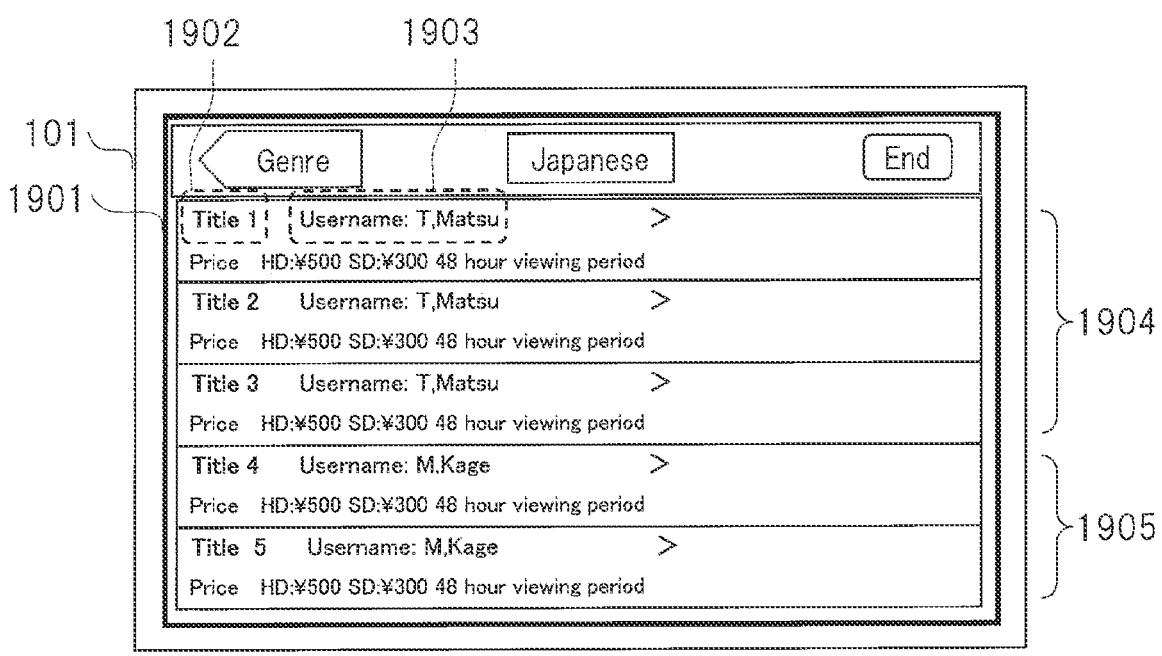
FIG. 19 is an explanatory drawing showing a display example of an aggregated content list display screen displayed on the television receiver.

FIG. 19 is an explanatory drawing showing a display example of an aggregated content list display screen 1901 displayed on the television receiver 101.

As shown in FIG. 19, the aggregated content list display screen 1901 may include a title name 1902 and a username 1903 such that the title and the corresponding user are recognized.

Note that, in the example of the aggregated content list display screen 1901, an indication 1904 of Titles 1 to 3 indicates content available for viewing by the username: T. Matsu, and an indication 1905 of Titles 4 and 5 indicates content available for viewing by the username: M. Kage. The username: T. Matsu is the user of the wireless terminal 102, and the username: M. Kage is the user of the wireless terminal 103 and the television receiver 101.

Figure 20:
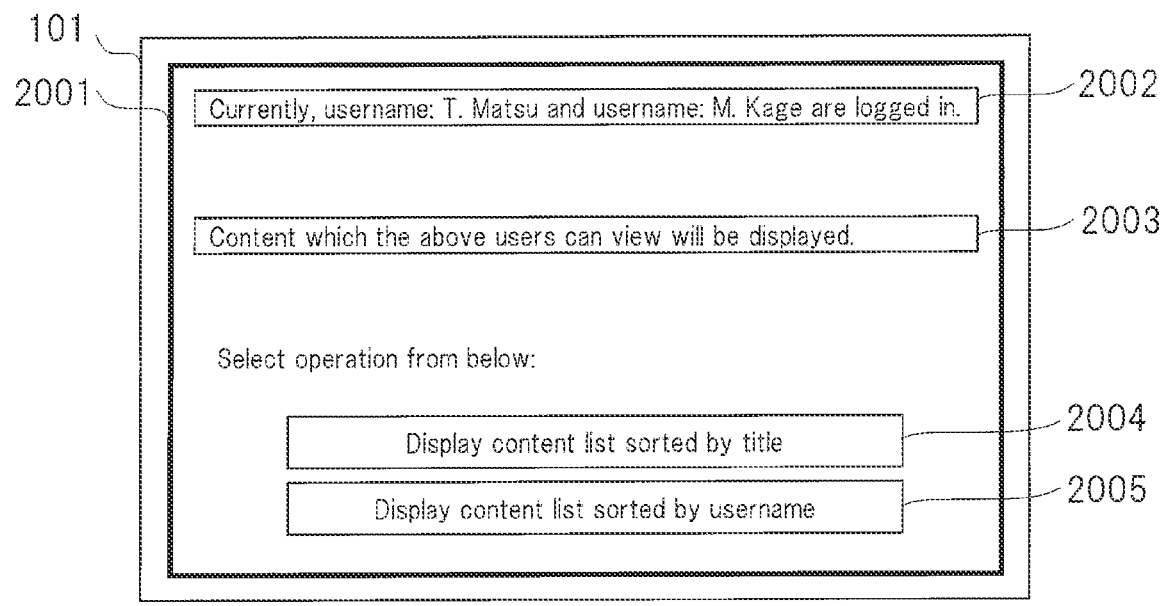
FIG. 20 is an explanatory drawing showing a display example of a sort process selection screen displayed on the television receiver.

It may be configured such that, before aggregating the content list information in a process of step S1708, the television receiver 101 displays a sort process selection screen 2001 shown in FIG. 20 in which the wireless terminal 102 or the wireless terminal 103 can select display by an indication 2004 or by an indication 2005.

The indication 2004 generates and displays a list of title names rearranged in alphabetical order or the like. The indication 2005 generates and displays a list of usernames rearranged in alphabetical order or the like.

At this time, a message 2002 indicating currently logged-in usernames, that is, usernames whose items of content are aggregated, and a message 2003 describing an action of the television receiver 101 such as "Content which the above users can view will be displayed" may be displayed.

In a case where each user operates the television receiver 101 via the wireless terminals 102 and 103 to end device connection between the wireless terminals 102 and 103 and the television receiver 101, the wireless terminals 102 and 103 are logged out one by one according to the processes of steps S1010 to S1012 which is the action sequence shown in FIG. 10.

Figure 21:
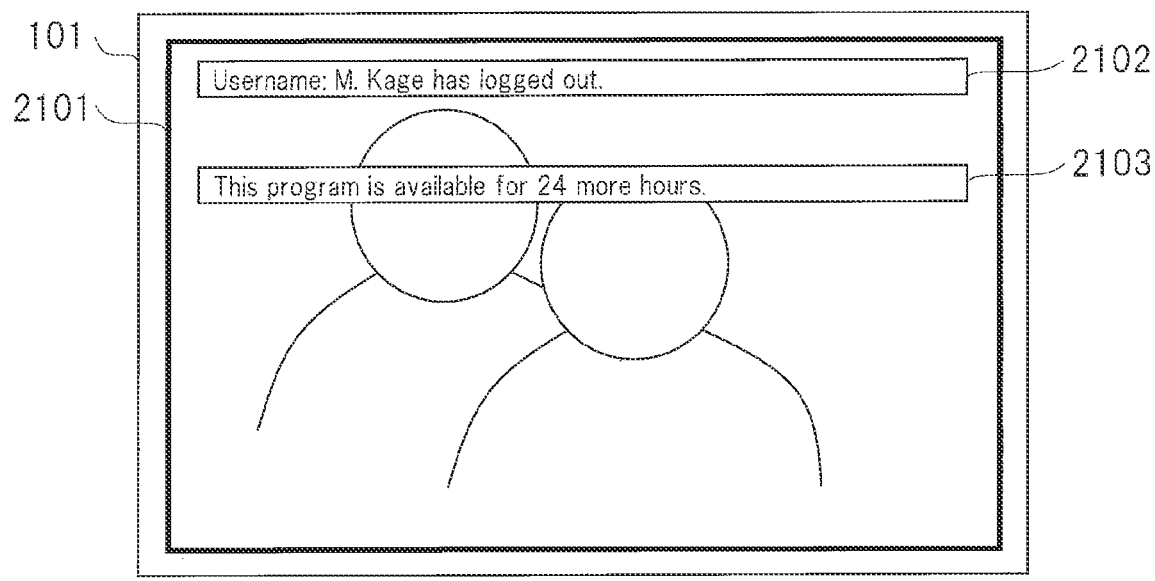
FIG. 21 is an explanatory drawing showing a display example of a logout notification screen displayed on the television receiver.

FIG. 21 is an explanatory drawing showing a display example of a logout notification screen displayed on the television receiver 101.

As shown in FIG. 21, when the wireless terminals 102 and 103 log out, the television receiver 101 may display a logout notification screen 2101 and a message 2102 indicating which user has logged out.

In addition, in a case where the user (M. Kage) logs out while viewing the content associated with the user account of the user (M. Kage) as in the indication 1905 of Titles 4 and 5 shown in FIG. 19, the television receiver 101 may send the distribution stop request to the content distribution server 106 (step S1221) and immediately disable viewing of this content.

Alternatively, the television receiver 101 may perform controls such that the user can continue to view the content during a certain period such as until the end of the content or until the television receiver 101 is turned off.

Namely, it may be configured such that the television receiver 101 does not send the distribution stop request to the content distribution server 106 (step S1221) until this certain period passes. In addition, it may be configured such that the user can view the content several times during a certain period such as for 24 hours after the other user (M. Kage) has logged out.

Namely, it may be configured such that the television receiver 101 continues to maintain the login information (username and password) of the logged-out user (M. Kage) in the memory 215 during the certain period and sends the login information related to the logged-out user (M. Kage) in a process of step S1705 shown in FIG. 17.

It may be configured such that a message 2103 as shown in FIG. 21 indicating a period during which content can be viewed is displayed at this time.

In the above-described manner, the content lists associated with the user account of each user can be aggregated and displayed as one aggregated list by the plurality of users respectively using the wireless terminals 102 and 103 to share and simultaneously log in to the television receiver 101.

In this manner, it is possible to improve user-friendliness of the network terminal system.

Second Embodiment

<Overview>

According to a second embodiment, the wireless terminals 102 and 103 simultaneously log in to the content distribution server 106 via the television receiver 101 to obtain services with an added value, that is, a value-added service from the content distribution server 106.

It is assumed that the value-added service is prepared in advance by the service provider providing the content.

<Example of Actions in Network Terminal System>

Figure 22:
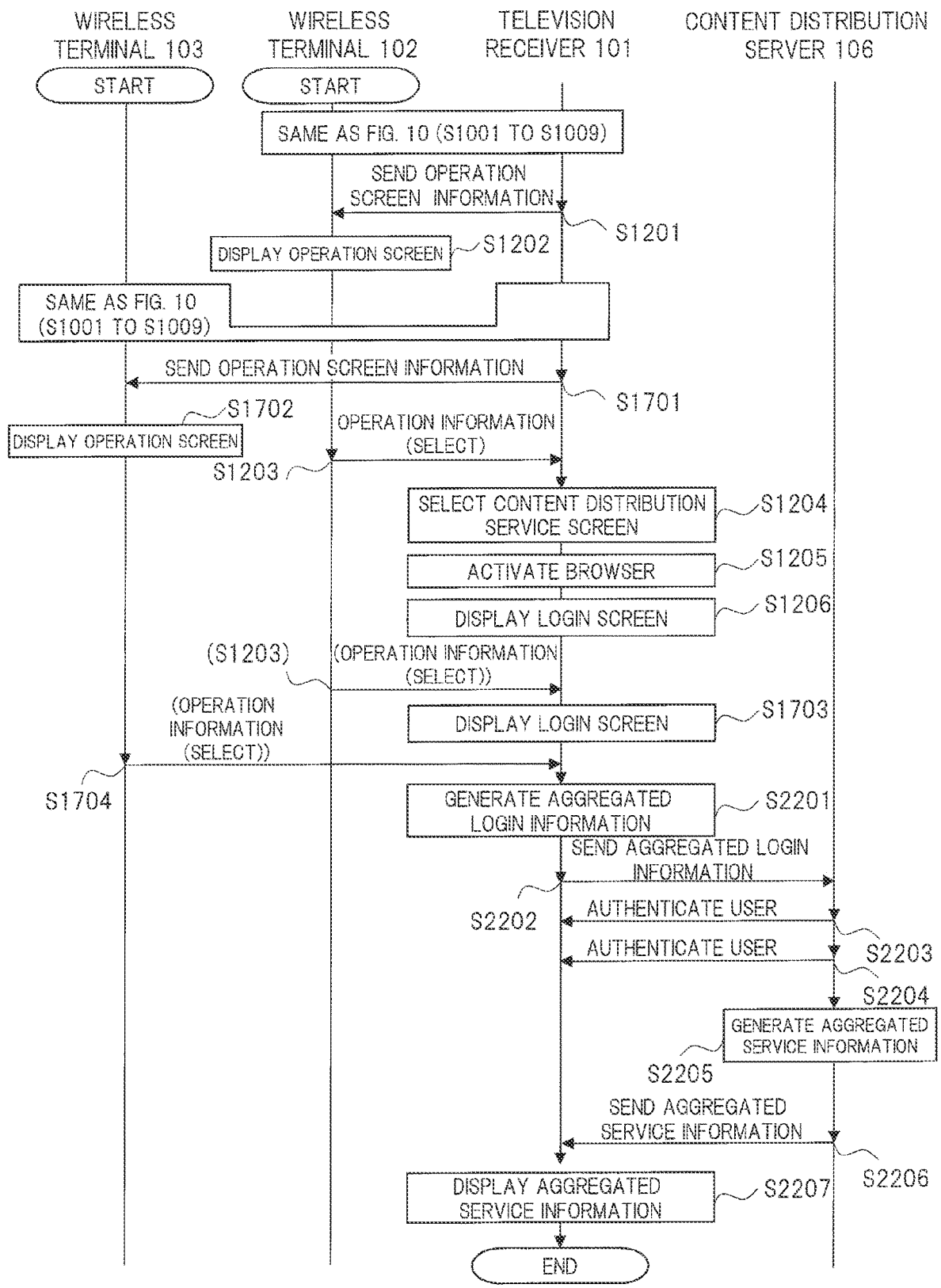
FIG. 22 is a flowchart showing an example of processes in a network terminal system according to a second embodiment.

FIG. 22 is a flowchart showing an example of processes in a network terminal system according to the second embodiment.

The second embodiment will be described with emphasis on differences from the first embodiment. The configuration of the network terminal system, the software configuration of the television receiver 101 and the software configuration of the wireless terminal 102 are the same as those of the first embodiment, and thus, redundant descriptions will be omitted.

FIG. 22 is a flowchart corresponding to FIG. 17 of the first embodiment, and hereinafter, the second embodiment will be described with emphasis on differences from the first embodiment.

An action sequence, particularly a process of step S2202 and a process of step S2205, of the flowchart shown in FIG. 22 significantly differs from the action sequence shown in FIG. 17.

The process of step S2202 is a process of sending aggregated login information described below from the television receiver 101 to the content distribution server 106. The process of step S2205 is a process of creating an aggregated service menu in the content distribution server 106.

First, in step S1201 of FIG. 22 continued from the processes of steps S1001 to S1009 which are the sequence of FIG. 10 of sending and storing the profile information from the wireless terminal 102 to the television receiver 101, the television receiver 101 sends the operation screen information for displaying the operation screen on the display 308 of the wireless terminal 102 to the wireless terminal 102 as in the sequence shown in FIG. 17 (S1201).

The wireless terminal 102 displays the operation screen shown in FIG. 13 on the display 308 based on the operation screen information in the process of step S1202. In addition, in the process of step S1701 continued from steps S1001 to S1009 which are the sequence of FIG. 10 of sending and storing the profile information from the wireless terminal 103 to the television receiver 101, the television receiver 101 sends the operation screen information for displaying the operation screen on the display 308 of the wireless terminal 103 to the wireless terminal 103. The wireless terminal 103 displays the operation screen shown in FIG. 13 on the display 308 based on the operation screen information in the process of step S1702.

When a tap operation is performed on the cursor/OK button 1307 of an operation screen 1301 of the wireless terminal 102, "operation information (select)" is sent as in the process of step S1203, and the television receiver 101 displays a login screen of the content viewing portal on the display 210 according to the processes of steps S1204 to S1206 which are the action sequence shown in FIG. 12.

In the login screen displayed by the above-described processes, the controller 214 temporarily stores the login information including the username and password entered from the wireless terminal 102 in a memory 215 by the same operation information as in the process of step S1203.

Likewise, the television receiver 101 displays the same login screen as in the process of step S1206 targeting the wireless terminal 103 (step S1703). In the login screen displayed by the above-described processes, the controller 214 temporarily stores the login information including the username and password entered from the wireless terminal 103 in the memory 215 by the same operation information (step S1704) as in the process of step S1203.

Subsequently, the television receiver 101 generates the aggregated login information (step S2201) and sends the aggregated login information to the content distribution server 106 (step S2202).

<Example of Aggregated Login Information>

Figure 23:
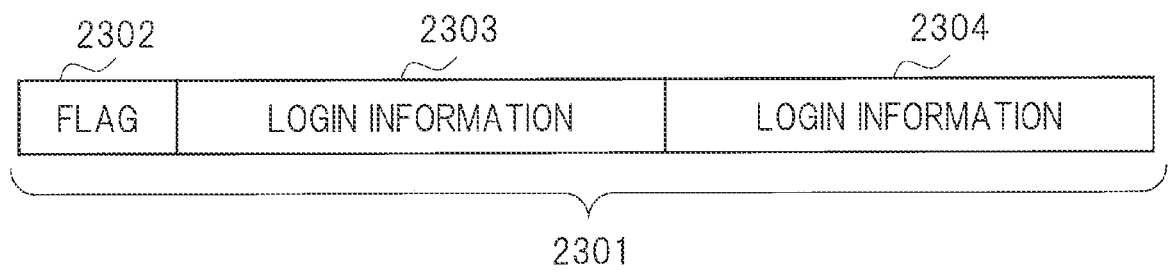
FIG. 23 is an explanatory drawing showing an example of aggregated login information generated in a process of step S2201 of FIG. 22.

FIG. 23 is an explanatory drawing showing an example of aggregated login information 2301 generated in a process of step S2201 of FIG. 22.

As shown in FIG. 23, the aggregated login information 2301 includes a flag 2302 and pieces of login information 2303 and 2304. The flag 2302 is a flag for distinguishing general login information. The pieces of login information 2303 and 2304 are pieces of login information related to all users attempting to simultaneously log in. In this case, the login information 2303 is login information related to the wireless terminal 102, and the login information 2303 is login information related to the wireless terminal 103.

The content distribution server 106 having received the aggregated login information 2301 refers to the user authentication information stored in the user authentication information 407 by the user manager 701 and performs user authentication for all users included in the aggregated login information as long as the users are authorized and registered users. Namely, the user authentication of the wireless terminal 102 is performed in the process of step S2203, and the user authentication of the wireless terminal 103 is performed in step S2204.

After authentication of all users is completed, the content distribution server 106 generates aggregated service information described below (step S2205) and sends the aggregated service information to the television receiver 101 (step S2206). At this time, details of aggregated service may be changed according to the number of users in the aggregated login information.

Figure 24:
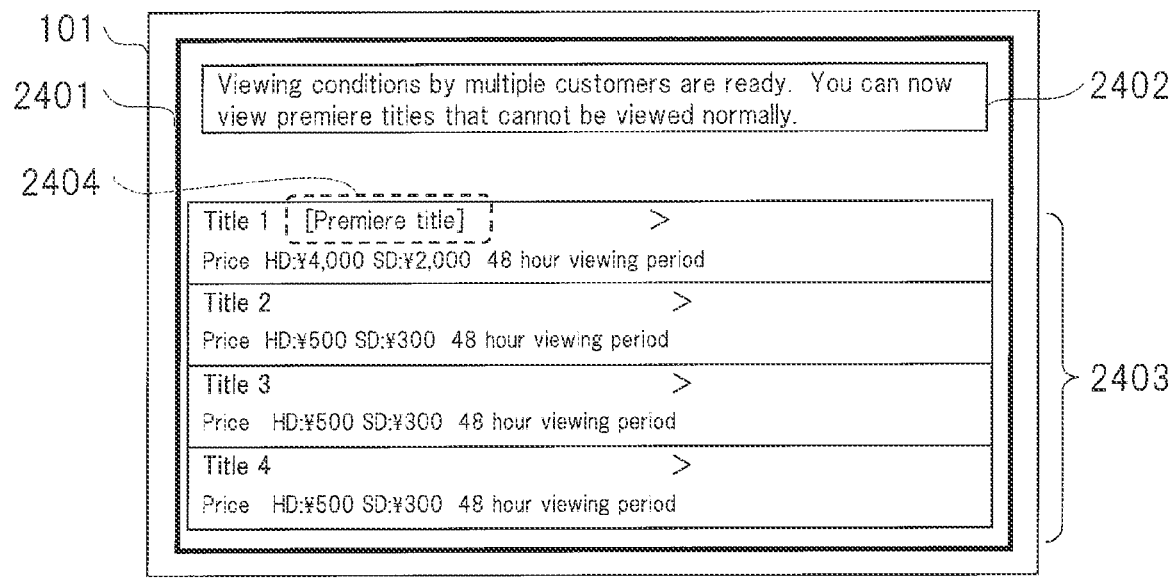
FIG. 24 is an explanatory drawing showing a display example of an aggregated service display screen in a process of step S2207 of FIG. 22.

The television receiver 101 displays an aggregated service display screen 2401 generated based on the received aggregated service information and shown in FIG. 24 (step S2207).

<Display Example of Aggregated Service Display Screen>

FIG. 24 is an explanatory drawing showing a display example of the aggregated service display screen in a process of step S2207 of FIG. 22.

The aggregated service display screen 2401 may include a message 2402 indicating an added value obtained when the wireless terminals 102 and 103 simultaneously log in to the content distribution server via the same television receiver 101.

In the example shown in FIG. 24, the added value is that a premiere title becomes available for viewing, the premiere title being a content title not available for viewing normally, that is, in a state where only a single wireless terminal is logged in.

In addition, the aggregated service information sent from the content distribution server 106 includes content list information 2403, and a message 2404 indicating that Title 1 of the content list information 2403 is a premiere title now available for viewing is displayed.

At this time, the content distribution server 106 may generate the content list information 2403 such that the premiere title is displayed at a higher level than general titles. Alternatively, the television receiver 101 may sort and display the content list information 2403 such that the premiere title is displayed at a higher level than the general titles.

<Another Display Example of Aggregated Service Display Screen>

Figure 25:
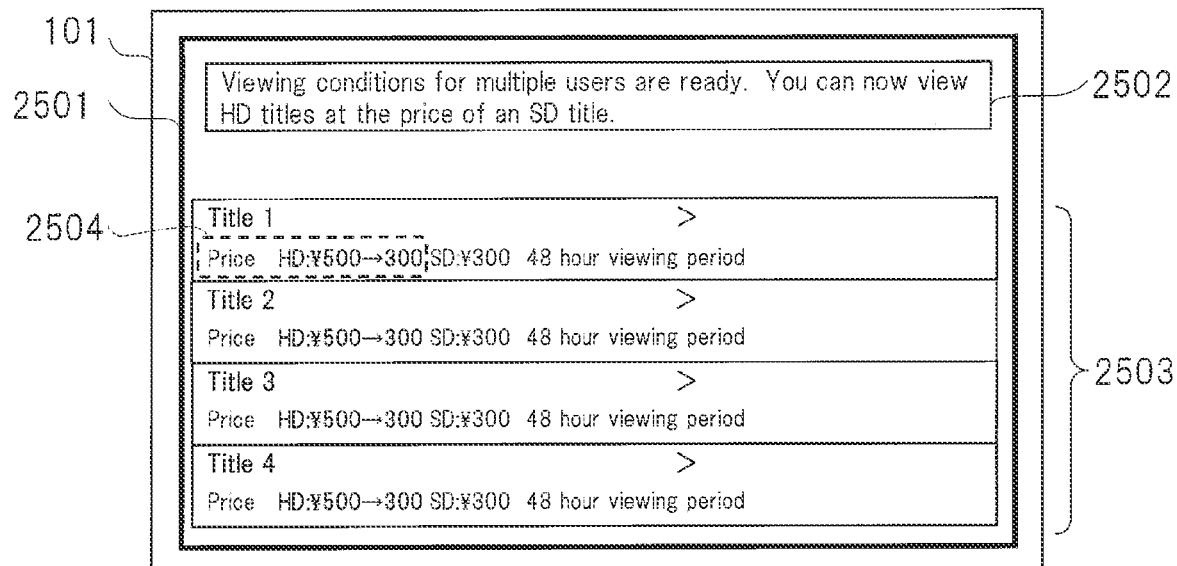
FIG. 25 is an explanatory drawing showing another display example of an aggregated service display screen in the process of step S2207 of FIG. 22.

FIG. 25 is an explanatory drawing showing another display example of an aggregated service display screen in the process of step S2207 of FIG. 22.

An aggregated service display screen 2501 shown in FIG. 25 may include a message 2502 indicating an added value obtained when the wireless terminals 102 and 103 simultaneously log in to the content distribution server via the same television receiver 101.

In the example shown in FIG. 25, the added value is that a for-pay content becomes available at a fee that is cheaper than normal, that is, when a single wireless terminal is logged in.

In addition, the aggregated service information sent from the content distribution server 106 includes content list information 2503, and a message 2504 is displayed in the content list information 2503.

The message 2504 displays a message indicating that Titles 1 to 4 can be viewed in HD quality at the same price (for example, 300 yen) of viewing in SD quality.

At this time, in order to clarify which portion has been changed, the content distribution server 106 may generate the content list information 2403 such that the changed portion is highlighted and displayed by blinking the changed portion, by displaying the changed portion into bold characters or the like, or by displaying the original and changed items side by side.

In the case of FIG. 25, the portion indicating the changed item is, for example, an HD viewing fee, and the original and changed items correspond to the indication of ¥500→¥300.

As described above, the aggregated login information obtained by aggregating the pieces of login information of the plurality of users as one information is sent to the content distribution server, so that special services, that is, aggregated services unobtainable by a single user can be provided.

In this manner, it is possible to enhance the added value of the network terminal system.

Third Embodiment

<Overview>

A third embodiment will describe an example of actions in which a service with an added value can be obtained from the content distribution sever by the plurality of wireless terminals simultaneously logging in to the content distribution server via the same television receiver. In particular, a value-added service with an added value to billing will be described.

The value-added service obtains a service for splitting a fee for viewing or using the content between the plurality of users, in other words, a split payment service.

It is assumed that the value-added service is prepared in advance by the service provider providing the content.

<Example of Actions in Network Terminal System>

Figure 26:
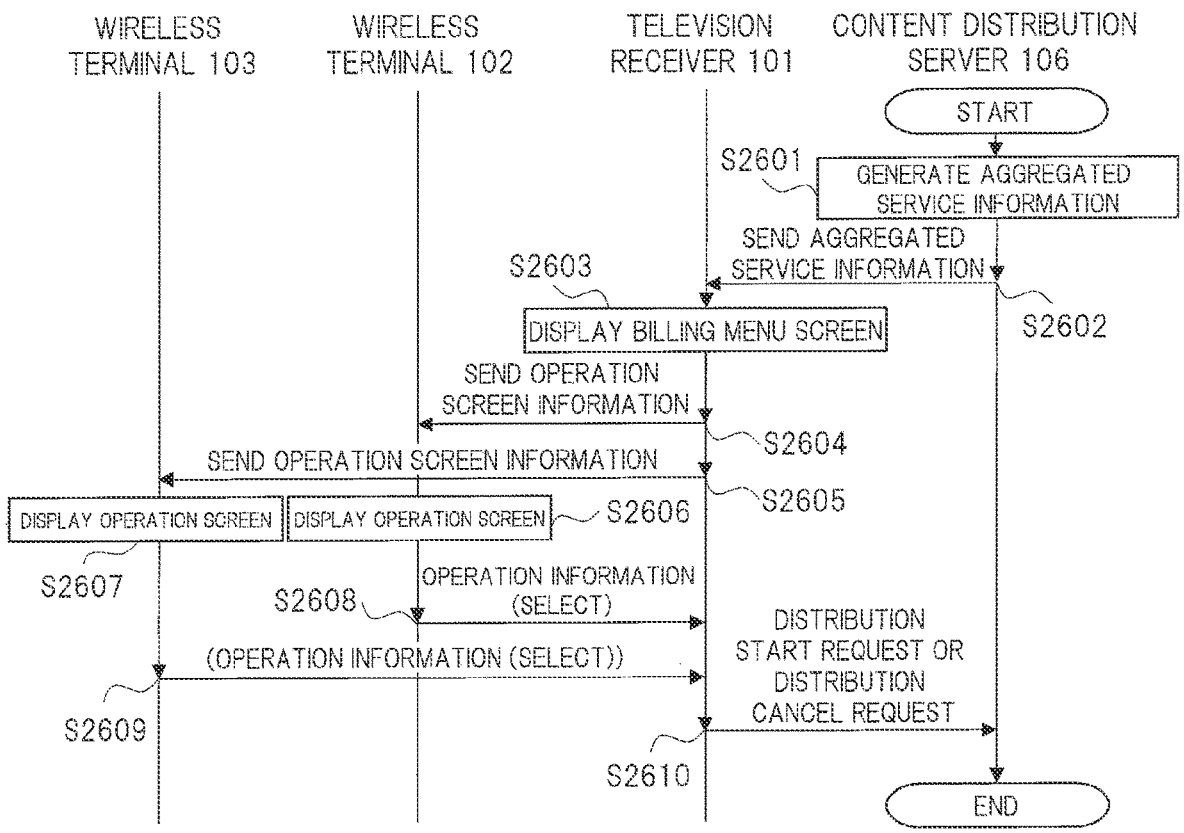
FIG. 26 is a flowchart showing an example of actions in the network terminal system according to a third embodiment.

FIG. 26 is a flowchart showing an example of actions in the network terminal system according to the third embodiment.

In FIG. 26, the processes from step S1011 of starting the processing of the wireless terminal 102 and the wireless terminal 103 to step S2203 and 2204 of performing user authentication in the action sequence of FIG. 22 of the second embodiment are the same (common). Further, the processes subsequent to step S2205 of generating aggregated service information shown in FIG. 22 are replaced with the processes subsequent to the step of generating aggregated service information (step S2601) shown in FIG. 26.

In FIG. 26, the content distribution server 106 generates the aggregated service information related to billing (step S2601) and sends the aggregated service information to the television receiver 101 (step S2602). The television receiver 101 generates and displays a billing menu display screen based on the received aggregated service information (step S2603).

<Display Example of Billing Menu Display Screen>

Figure 27:
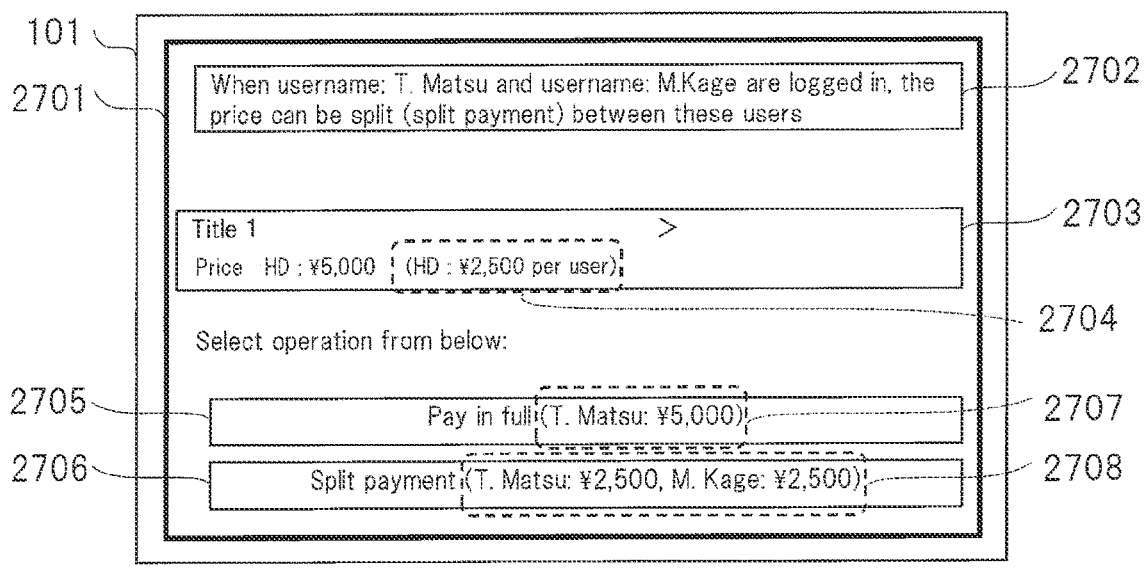
FIG. 27 is an explanatory drawing showing a display example of a billing menu display screen in a process of step S2603 of FIG. 26.

FIG. 27 is an explanatory drawing showing a display example of a billing menu display screen 2701 in the process of step S2603 of FIG. 26.

The billing menu display screen 2701 may include a message 2702 indicating an added value obtained when the wireless terminals 102 and 103 simultaneously log in to the content distribution server 106 via the same television receiver 101.

FIG. 27 shows an example of a value-added service where a viewing fee can be split between the users (T. Matsu and M. Kage) of the wireless terminals 102 and 103 logged in to the television receiver 101.

In addition, the aggregated service information sent from the content distribution server 106 includes content list information 2703, and a message 2704 indicating a viewing fee split for Title 1 in the content list information 2703 is displayed.

Further, the billing menu display screen 2701 may include messages 2705 and 2706 indicating details on splitting the fee between the users. In addition, the billing menu display screen 2701 may be configured to display the messages 2705 and 2706 indicating details on splitting the fee as options, allowing the user to select a specific amount from these options. In this case, split payment details 2707 and 2708 of each option may be displayed.

In FIG. 26, the television receiver 101 displays a billing menu display screen in the above-described process of step S2603, and thereafter, sends each operation screen information to each of the wireless terminals 102 and 103 (steps S2604 and S2605).

Each of the wireless terminals 102 and 103 displays the operation screen on each display 308 (steps S2606 and S2607).

<Display Example of Operation Screen>

Figure 28:
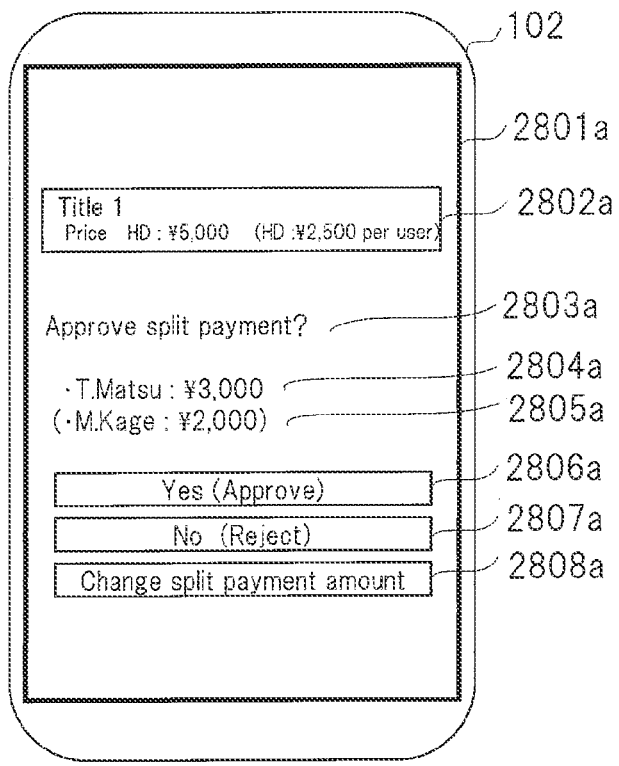
FIGS. 28(a)-28(b) are explanatory drawings showing an example of an operation screen in processes of steps S2606 and S2607 of FIG. 26.
Figure 28:
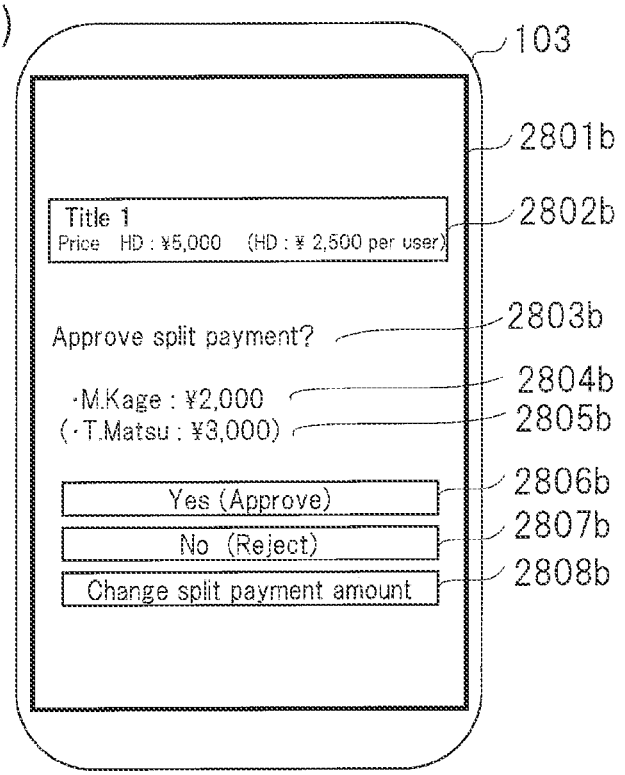

FIGS. 28(a)-(b) are explanatory drawings showing an example of an operation screen in processes of steps S2606 and S2607 of FIG. 26.

FIG. 28(a) shows a display example of an operation screen 2801a of the wireless terminal 102, and FIG. 28(b) shows a display example of the operation screen 2801a of the wireless terminal 103.

In FIG. 28(a), the operation screen 2801a may include a message 2802a indicating the same items as the content list information 2703 displayed on the television receiver 101.

In addition, the operation screen 2801a may be configured to display a message 2803a prompting approval of the split payment, display an option 2806a indicating the approval and an option 2807a indicating rejection of the approval, and allow each user to select the option.

Further, an option 2808a for changing a split payment amount may be displayed. When the user taps this option 2808a, the user (T. Matsu) of the wireless terminal 102 may enter the payment amount in, for example, an operation screen 1301 shown in FIG. 13(a).

The example of the operation screen 2801a indicates a situation after a tap operation is performed on the option 2808a and the payment amount is entered by a method not shown.

A message 2804a indicating (¥3,000) which is the payment amount of the user (T. Matsu) of the wireless terminal 102 and a message 2805a indicating (Y2,000) which is a payment amount of the user (M. Kage) of the wireless terminal 103 are displayed.

At this time, the payment amount of the user (T. Matsu) of the wireless terminal 102 may be highlighted or the like and displayed such that the payment amount of the user of the wireless terminal 102 can be distinguished from the payment amounts of other users. In addition, for example, a fee paid by the user displayed on a lowermost side and is (M. Kage) in the example of FIG. 28(a) may be the remaining amount of the payment amount automatically calculated/obtained by subtracting a total payment amount of the other users from (Y5,000) which is a viewing fee of Title 1 to display the message 2805a.

Subsequently, messages 2802b, 2803b, 2806b, 2807b and 2808b displayed on an operation screen 2801b of FIG. 28(b) have the same items as the messages 2802a, 2803a, 2806a, 2807a and 2808a displayed on the operation screen 2801a shown in FIG. 28(a).

On the other hand, a message 2804b indicating (¥2,000) which is a payment amount of the user (M. Kage) of the wireless terminal 103 is displayed at an upper level, and a message 2805b indicating (¥3,000) which is a payment amount of another user (T. Matsu) is displayed at a lower level.

Namely, a display order may be sorted such that the payment amount of each user of the wireless terminals 102 and 103 is displayed at the uppermost level on the corresponding operation screen.

As described above, the aggregated login information obtained by aggregating the pieces of login information of the plurality of users is sent to the content distribution server as one piece of information, so that the payment amount for viewing the for-pay content can be split between the plurality of users.

In this manner, it is possible to further improve user-friendliness of the network terminal system.

Fourth Embodiment

<Overview>

A fourth embodiment will describe default settings for setting the content shareability and whether or not to split the viewing fee between the users of wireless terminals 102 and 103 for each of the above-described actions of the first to fourth embodiments, that is, for each of the actions in which the wireless terminals 102 and 103 simultaneously access the television receiver 101.

Hereinafter, sharing the content with other users and splitting the viewing fee will be referred to as "shared viewing".

<Setting Example of Default Setting>

FIGS. 29(a)-(d) are explanatory drawings showing an example of default settings information of the wireless terminal 102 or 103 according to the fourth embodiment.

The default settings information is stored in a storage 304 of the wireless terminals 102 and 103 of FIG. 3. In addition, it is assumed that the default settings information is set by each user utilizing the wireless terminals 102 and 103.

FIG. 29(a) shows an example of the default settings information for setting viewing shareability 2902 per service division 2901. The service division 2901 includes identification information for distinguishing each service.

In addition, the viewing shareability 2902 includes a flag indicating whether the shared viewing is permitted (YES) or shared viewing is not permitted (NO). FIG. 29(a) shows an example in which common movies and games are available for shared viewing and R18-rated movies, that is, movies including inappropriate content for minors under the age of 18, are not available for shared viewing.

FIG. 29(b) shows an example of the default settings information for setting viewing shareability 2904 per content/application division 2903.

The content/application division 2903 includes identification information for distinguishing each provider. In addition, the viewing shareability 2904 includes a flag indicating whether the shared viewing is permitted (YES) or shared viewing is not permitted (NO).

FIG. 29(b) shows an example in which the content of Title A and Title C is available for shared viewing and the content of Title B is not available for shared viewing.

FIG. 29(c) shows an example of default settings information for setting viewing shareability 2906 per provider division 2905 such as a content provider, a network provider or the like.

The provider division 2905 includes identification information for distinguishing each provider. In addition, the viewing shareability 2906 includes a flag indicating whether the shared viewing is permitted (YES) or shared viewing is not permitted (NO).

FIG. 29(c) shows an example in which the content and applications whose providers are Company A and Company C are available for shared viewing, and the content and applications whose provider is Company B are not available for shared viewing.

FIG. 29(d) shows an example of default settings information for setting the viewing shareability 2906 per billing destination division 2907.

The content/application division 2903 includes identification information for distinguishing each provider. In addition, the viewing shareability 2908 includes a flag indicating whether the shared viewing is permitted (YES) or shared viewing is not permitted (NO).

FIG. 29(d) shows an example in which the content and applications whose billing destinations are Company A and Company C are available for shared viewing, and the content and applications whose billing destination is Company B are not available for shared viewing.

Note that the service division 2901 shown in FIG. 29(a) and the content/application division 2903 shown in FIG. 29(b) may be extracted by the television receiver 101 from an electronic program guide (EPG) associated with each content sent from the content distribution server 106 and sent to the wireless terminal 102 or extracted by the wireless terminal 102.

The service division 2901 or the content/application division 2903 extracted from each content in this manner is compared with the service division 2901 or the content/application division 2903 stored in the storage 304. When the service division 2901 or the content/application division 2903 extracted from each content is not yet stored in the storage 304, the service division 2901 or the content/application division 2903 may be added to the storage 304.

In addition, the provider division 2905 shown in FIG. 29(c) and the billing destination division 2907 shown in FIG. 29(d) may be added to the storage 304 when signing up with a new provider or billing destination by using the wireless terminal 102.

The wireless terminal 102 stores and maintains these pieces of default settings information in each storage 304, and the user profile generator 609 generates the profile information of the user of the wireless terminal 102 (step S1007 of FIG. 10). Further, the wireless terminal 102 sends the profile information to the television receiver 101 (step S1008 of FIG. 10). Note that the same operations are performed in the wireless terminal 103.

The television receiver 101 refers to each item of viewing shareabilities 2902, 2904, 2906 and 2908 sent as the profile information and displays the items matching the conditions of "shareability: YES" on the above-described content list display screens 1501 and 1901, aggregated service display screens 2401 and 2501 and billing menu display screen 2701. In addition, the television receiver 101 does not display items of "shareability: NO" on each of the screens 1501, 1901, 2401, 2501 and 2701.

<Display Example of Default Settings Screen>

Figure 30:
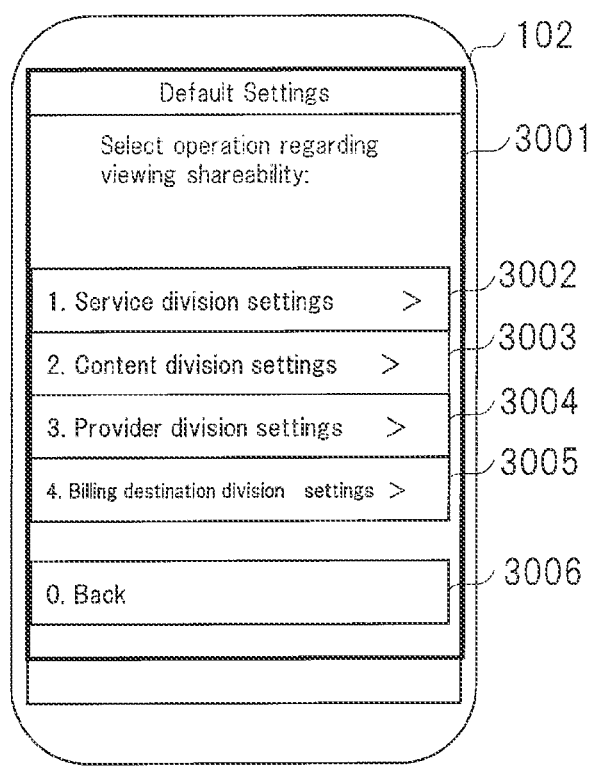
FIGS. 30(a)-30(b) are explanatory drawings showing an example of a default settings screen displayed on the wireless terminal.
Figure 30:
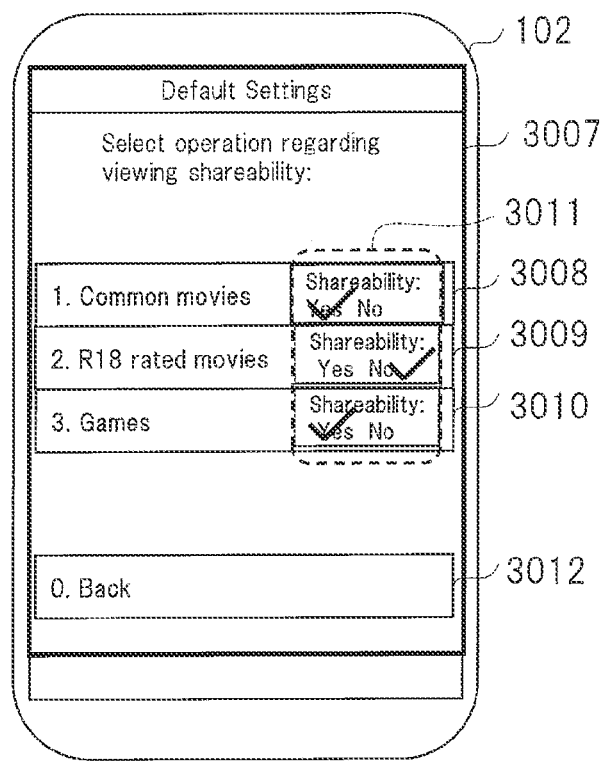

FIGS. 30(a)-(b) are explanatory drawings showing an example of a default settings screen displayed on the wireless terminal 102.

In FIG. 30(a), the default settings screen 3001 displays options 3002, 3003, 3004 and 3005 for selecting the default settings information shown in FIGS. 29(a), 29(b), 29(c) and 29(d).

Namely, the option 3002 is an option for switching to the default settings screen corresponding to FIG. 29(a), and the option 3003 is an option for switching to the default settings screen corresponding to FIG. 29(b).

In addition, the option 3004 is an option for switching to the default settings screen corresponding to FIG. 29(c), and the option 3005 is an option for switching to the default settings screen corresponding to FIG. 29(d).

The default settings screen 3001 may display an option 3006 for returning to a screen displayed before entering the default settings screen 3001. When the user of the wireless terminal 102 taps and selects the option 3002 shown in FIG. 30(a), the wireless terminal 102 displays, for example, the default settings screen 3007 shown in FIG. 30(b).

In FIG. 30(b), the default settings screen 3007 is a default settings screen corresponding to FIG. 29(a) and displays options 3008, 3009 and 3010.

In the option 3008, viewing shareability for common movies is selected according to the preset service division 2901. In the option 3009, viewing shareability for R18-rated movies is selected, and in the option 3010, viewing shareability for games is selected.

Each of the options 3008, 3009 and 3010 includes an option 3011 for selecting one of "Shareability: YES" and "Shareability: NO". The user of the wireless terminal 102 taps and selects one of "Shareability: YES" and "Shareability: NO" to display the selected result in the option 3011.

In addition, the default settings screen 3007 may display an option 3012 for returning to a screen displayed before entering the default settings screen 3007, that is, the default settings screen 3001.

Note that the default settings screen displayed when the user selects the options 3003, 3004 and 3005 on the default settings screen 3001 shown in FIG. 30(a) and actions thereof are the same as the default settings screen and actions thereof described with reference to FIG. 30(b), and thus, illustrations and redundant descriptions will be omitted.

In the above-described manner, when the plurality of users perform "shared viewing", flag information indicating viewing shareability per division is stored and maintained in each wireless terminal of each user, so that the plurality of users can share and view content of the division available for shared viewing without disclosing the items (title, content, or the like) of the division not available for shared viewing.

Fifth Embodiment

<Overview>

The present embodiment will describe a technique in which portions (steps S1001 and S1002) in the actions (steps S1001 to S1009 of FIG. 10) of exchanging information between the wireless terminal 102 and the television receiver 101 shown in FIG. 10 are replaced with actions (steps S3101 to S3104) described below.

<Example of Actions in Network Terminal System>

Figure 31:
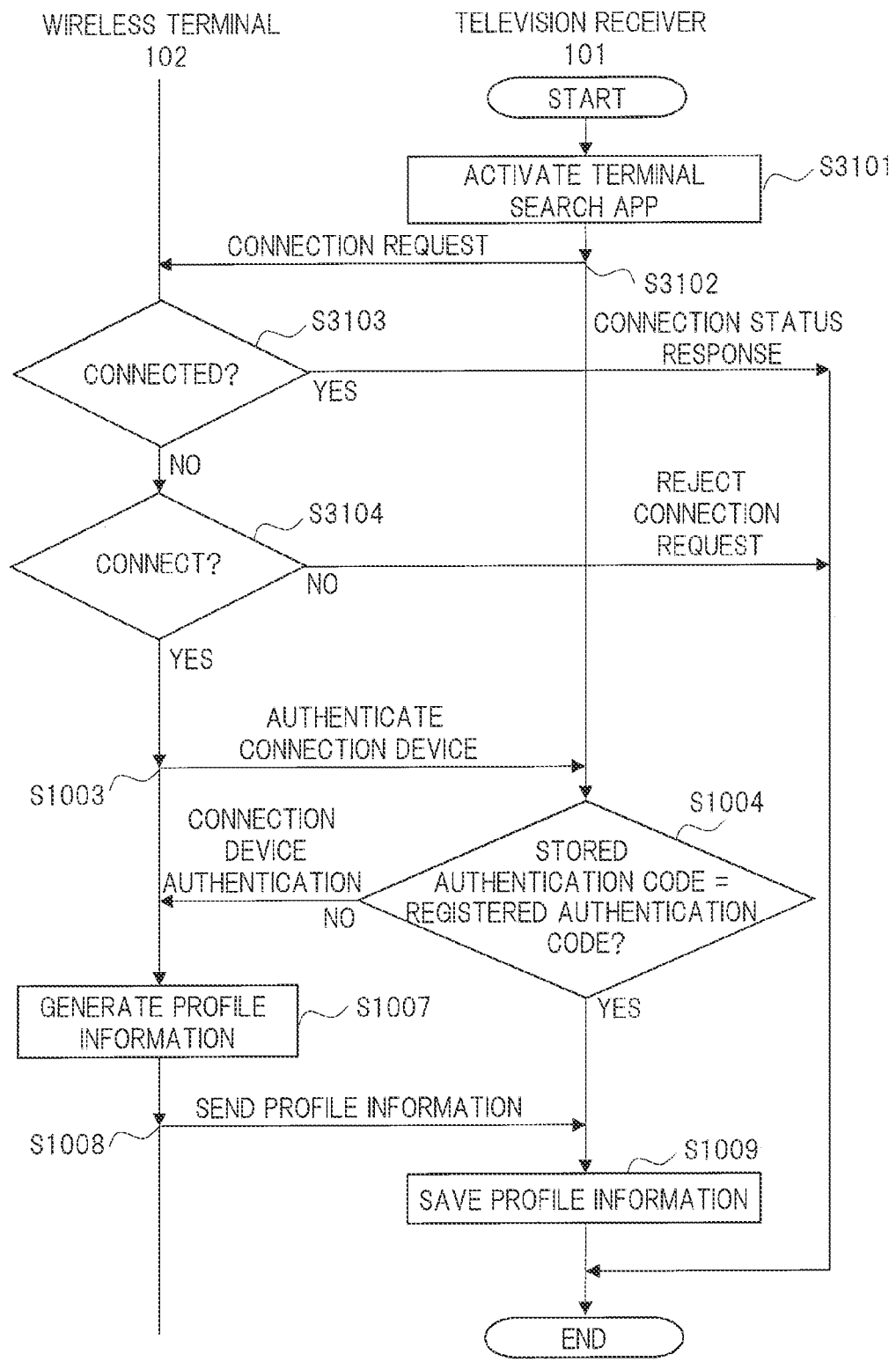
FIG. 31 is a flowchart showing an example of processes in a network terminal system according to a fifth embodiment.

FIG. 31 is a flowchart showing an example of processes in the network terminal system according to a fifth embodiment.

FIG. 31 shows actions in which processes of steps S1001 and S1002 in the above-described actions (steps S1001 to S1009) of exchanging information between the wireless terminal 102 and the television receiver 101 shown in FIG. 10 are replaced with processes of steps S3101 to S3104 of FIG. 31 described below. Note that the configuration of the network terminal system is the same as that of the first embodiment of FIG. 1.

In FIG. 31, the television receiver 101 activates a "terminal search App" which is a terminal detector (step S3101). The "terminal search App" is an application program which is stored in the storage 216 and broadcasts a connection request (step S3102) to search for a wireless terminal in the same local network capable of accessing the television receiver 101 via a wireless router 104. The "terminal search App" is activated by a timer (not shown) within the television receiver 101. The "terminal search App" is activated on a regular basis and may be activated, for example, approximately once every several minutes.

Note that the "terminal search App" can be achieved by a generally known technique, and thus, illustrations and detailed descriptions will be omitted. The connection request may include information and device ID which allow the user to identify a device having sent the connection request. The information which allows the user to identify the device is, for example, a model name (AB-C1000) of the television receiver 101, and the device ID is, for example, 3D:4F:1E:00:xx:xx and the like.

The wireless terminal 102 having received the connection request determines whether or not the wireless terminal 102 "is connected" to the television receiver 101 in step S3103. If the wireless terminal 102 is connected (YES), the wireless terminal 102 returns a connection status response indicating that the wireless terminal 102 is connected to the television receiver 101 and ends the operation.

On the other hand, if the wireless terminal 102 is not connected (NO), the network connection confirmation screen is displayed on the display 308 and confirms "whether or not to connect" to the user (step S3104).

Figure 32:
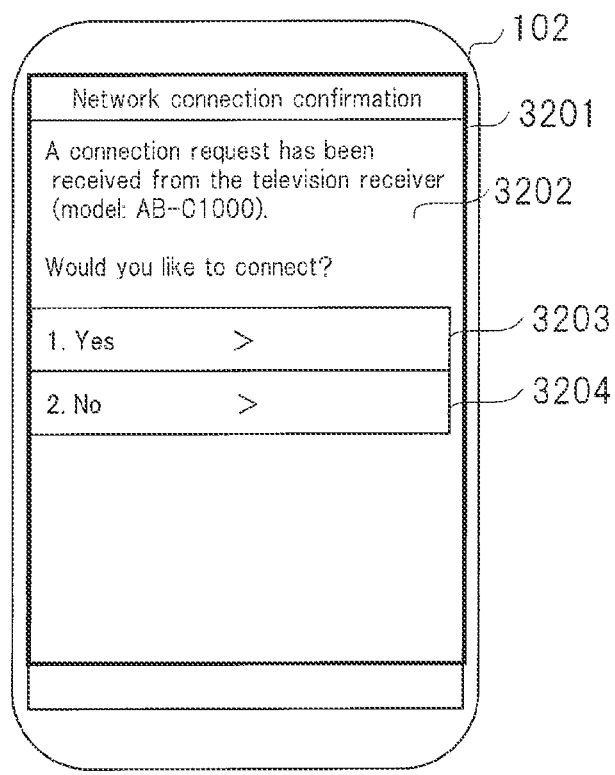
FIG. 32 is an explanatory drawing showing an example of a network connection confirmation screen in a process of step 3104 of FIG. 31.

FIG. 32 is an explanatory drawing showing an example of a network connection confirmation screen 3201 in a process of step S3104 of FIG. 31. FIG. 32 shows a display example of the network connection confirmation screen 3201 of, for example, the wireless terminal 102.

The network connection confirmation screen 3201 includes a message 3202 indicating that "a connection request has been received from the television receiver", an option 3203 indicating that "connection approved" and an option 3204 indicating that "connection rejected".

The message 3202 may include information such as the above-described model name (AB-C1000) or device ID (3D:4F:1E:00:xx:xx) of the television receiver 101, allowing the user to identify the device having sent the connection request.

When the user selects the option 3203 indicating "approved" (step S3104: YES) by a tap operation or the like, a subsequent action of the process of step S1003 is performed. On the other hand, when the option 3204 indicating "rejected" is selected (step S3104: NO), the wireless terminal 102 returns a connection request rejection response to the television receiver 101 and ends the operation.

The processes of steps S1003 to S1009 shown in FIG. 31 are the same as the above-described processes of steps S1003 to S1009 shown in FIG. 10, and thus, redundant descriptions will be omitted.

Note that the television receiver 101 may be controlled such that the connection request is not sent to the wireless terminal 102 having returned the connection request rejection response for a certain period of time, such as one hour, in the process of step S3102.

Alternatively, the wireless terminal 102 having returned the connection request rejection response may be controlled such that the connection rejection request is automatically returned during a certain period of time, such as one hour, even if a connection request is received.

In addition, in a case where the television receiver 101 broadcasts the connection request in the process of step S3102 and no connection status response is sent from the connected wireless terminal 102, the television receiver 101 may be configured to delete the user profile information obtained from the wireless terminal 102 and automatically perform logout processing in the wireless terminal 102 as in the process of step S1011 shown in FIG. 10.

In the above-described manner, the television receiver 101 broadcasts the connection request to the wireless terminal 102 in the same local network, so that the user of the wireless terminal 102 can be saved from the trouble of actively logging in to the television receiver 101.

In this manner, it is possible to further improve user-friendliness of the network terminal system.

In the foregoing, the invention made by the present inventors has been concretely described based on the embodiments. However, it goes without saying that the present invention is not limited to the foregoing embodiments, and various modifications can be made within the scope of the present invention.

Note that the first to fifth embodiments have described cases where the television receiver and the like comprising a display 210 are utilized; however, the present invention can be achieved in a similar manner by an STB (Set-Top Box), a recorder with a display provided externally or the like. In addition, the foregoing embodiments can be achieved in a similar manner by a monitor apparatus, a large tablet terminal, an interactive whiteboard or the like comprising a communication I/F.

Note that the present invention is not limited to the foregoing embodiments and includes various modifications. For example, the foregoing embodiments have been described in detail such that the description of the present invention is easily understandable, and are not necessarily limited to comprise all of the configurations described above.

In addition, a portion of the configuration of one of the embodiments can be replaced with the configuration of another embodiment. Further, the configuration of one of the embodiments can be added to the configuration of another embodiment. Furthermore, other configurations may be added to, be removed from or replace a portion of the configuration of each of the embodiments.

LIST OF REFERENCE SIGNS

101: television receiver
102: wireless terminal
103: wireless terminal
104: wireless router
105: external network
106: content distribution server
107: broadcast station
108: base station
201: antenna
202: tuner/demodulator
203: station selection controller
204: signal separator
205: audio decoder
206: speaker
207: audio output unit
208: video decoder
209: superimposing unit
210: display
211: video output unit
213: input unit
214: controller
215: memory
216: storage
218: bus
301: tuner/demodulator
302: signal separator
303: memory
304: storage
305: acceleration sensor
306: geomagnetic sensor
307: controller
308: display
311: input unit
312: GPS receiver
313: gyro sensor
314: bus
402: controller
403: memory
404: storage
405: content
406: device authentication information
407: user authentication information
408: bus
501: connection device authentication unit
502: browser engine
503: HTML parser
504: database generator
505: renderer
506: image processor
507: content player
508: various application unit
509: account manager
510: content/application synchronization processor
511: connection device authentication program
512: browser program
513: content playback program
514: various application programs
515: account management program
516: content/application synchronization processing program
517: content
601: connection device authentication unit
602: browser engine
603: HTML parser
604: database generator
605: renderer
606: image processor
607: content player
608: various application unit
609: user profile generator
610: device authentication program
611: browser program
612: content playback program
613: various application programs
614: user profile generation program
615: content
701: user manager
702: content manager
703: content distributor
704: user management program
705: content management program
706: content distribution program

The invention claimed is:
1. A display apparatus connected to two or more information terminals via a first network and connected to a content distribution apparatus via a second network, the content distribution apparatus configured to distribute content, wherein the display apparatus comprises:

a communication interface configured to communicate with the two or more information terminals via the first network, and communicate with the content distribution apparatus via the second network;

a display configured to display content; and a controller configured to control the communication interface and the display, the controller is configured to:

receive pieces of login information entered from each of the two or more information terminals for logging in on a group basis, send the received pieces of login information to the content distribution apparatus for the content distribution apparatus to perform authentication process;

receive aggregated service information from the content distribution apparatus, the aggregated service information generated by the content distribution apparatus and including value-added information obtained when the two or more information terminals are logged in;

send information based on the received aggregated service information to the two or more information terminals logged in on a group basis; and display a content list based on the aggregated service information on the display, the content list including content available for viewing on the two or more information terminals logged in, wherein the content list to be displayed on the display includes content share information regarding shareability of the content between the two or more information terminals logged in on a group basis, the content share information being pre-set by a user who entered the pieces of login information into the information terminal, and wherein the information based on the aggregated service information to be sent to the two or more information terminals logged in on a group basis is value-added information obtained when the two or more information terminals log in to the content distribution apparatus on a group basis and indicating that the content not available for viewing by a single wireless terminal is available for viewing.

2. The display apparatus according to claim 1, wherein the controller is configured to generate aggregated login information in which the pieces of login information entered from each of the two or more information terminals for logging in on a group basis are aggregated, send the aggregated login information to the content distribution apparatus for the content distribution apparatus to perform authentication process.

3. The display apparatus according to claim 1, wherein the value-added information includes split payment information in the received information based on the aggregated service information, the split payment information indicating that a viewing fee of the content can be split between the two or more information terminals logged in on a group basis.

4. The display apparatus according to claim 1, wherein the controller is configured to detect the information terminal capable of accessing the display apparatus, send connection request information to the detected information terminal when the information terminal capable of accessing the display apparatus is detected, and obtain the pieces of login information from the information terminal with which connection has been established.

* * * * *